US011982104B2

(12) United States Patent
Trespidi

(10) Patent No.: US 11,982,104 B2
(45) Date of Patent: May 14, 2024

(54) LOCK CYLINDER

(71) Applicant: NEMESY S.R.L.C.R., Piacenza (IT)

(72) Inventor: Mauro Trespidi, Piacenza (IT)

(73) Assignee: NEMESY S.R.L.C.R., Piacenza (IT)

( * ) Notice: Subject to any disclaimer, the term of this patent is extended or adjusted under 35 U.S.C. 154(b) by 335 days.

(21) Appl. No.: 17/290,634

(22) PCT Filed: Nov. 6, 2019

(86) PCT No.: PCT/EP2019/080407
§ 371 (c)(1),
(2) Date: Apr. 30, 2021

(87) PCT Pub. No.: WO2020/099215
PCT Pub. Date: May 22, 2020

(65) Prior Publication Data

US 2021/0388637 A1 Dec. 16, 2021

(30) Foreign Application Priority Data

Nov. 16, 2018 (IT) ........................ 102018000010395

(51) Int. Cl.
*E05B 17/04* (2006.01)
*E05B 9/04* (2006.01)
(Continued)

(52) U.S. Cl.
CPC .............. *E05B 17/047* (2013.01); *E05B 9/04* (2013.01); *E05B 47/0642* (2013.01); *E05B 15/1614* (2013.01)

(58) Field of Classification Search
CPC ... E05B 9/04; E05B 9/041; E05B 9/10; E05B 15/1614; E05B 17/04; E05B 17/047;
(Continued)

(56) References Cited

U.S. PATENT DOCUMENTS 2,829,513 A * 4/1958 Fresard .................. E05B 9/041 70/377
3,170,317 A * 2/1965 Parlier ...................... E05B 9/10 70/377
(Continued)

FOREIGN PATENT DOCUMENTS

DE 3719311 A1 12/1988
EP 0215383 A1 3/1987
(Continued)

*Primary Examiner* — Christopher J Boswell
(74) *Attorney, Agent, or Firm* — Janeway Patent Law PLLC; John M. Janeway

(57) ABSTRACT

A lock cylinder is provided adapted to be installed in a lock comprising a lock bolt for driving the lock bolt. Said lock cylinder comprises a cylinder housing, and a revolving plug comprising a rotor element adapted to rotate with respect to the cylinder housing about a rotation axis within a rotation support, and a driving tooth for the lock bolt comprising an engage portion adapted to engage the lock bolt, said driving tooth being rotatable about the rotation axis together with the rotor element and being coupled to the rotor element in such a way the operative distance between the engage portion of the driving tooth and the rotation axis varies, while rotating about the rotation axis, as a function of the rotation angle of the rotor element with respect to the cylinder housing. When the lock cylinder is installed in the lock, said operative distance has one among a plurality of first values when the rotation angle of the rotor element belongs to a first angular interval corresponding to a position of the engage portion of the driving tooth that is proximal to the lock bolt; and said operative distance has one among a plurality of second values when the rotation angle belongs to a second angular interval corresponding to a position of the engage portion of the driving tooth that is distal to the lock bolt, each of said first values being higher than each of said second values. When the lock cylinder is installed in the
(Continued)

lock, the lock cylinder is located below the lock bolt along a first direction substantially perpendicular to the rotation axis. the driving tooth is slidingly housed within a seat which is radially provided in the rotor element and which defines at least one side opening of the rotor element perpendicular to the rotation axis. The driving tooth is provided with at least one engage element which protrudes from a side opening along a direction parallel to the rotation axis, and adapted to slidingly engage guide profiles provided on the rotation support, said guide profiles defining for said at least one engage element an overall guide profile having an eccentric shape arranged to support from below along said first direction said at least one engage element when the rotation angle of the rotor element belongs to both the first angular interval and to the second angular interval, said overall guide profile being adapted to cause said variation of the operative distance as a function of the rotation angle of the rotor element with respect to the cylinder housing.

17 Claims, 16 Drawing Sheets

(51) Int. Cl.
*E05B 47/06* (2006.01)
*E05B 15/16* (2006.01)

(58) Field of Classification Search
CPC ............... E05B 17/048; E05B 47/0619; E05B 47/0626; E05B 47/063; E05B 47/0642
See application file for complete search history.

(56) References Cited

U.S. PATENT DOCUMENTS

| | | | | | |
|---|---|---|---|---|---|
| 4,603,566 | A * | 8/1986 | Kruehn | E05B 17/047 70/380 |
| 5,839,305 | A * | 11/1998 | Aston | E05B 47/063 70/283.1 |
| 6,532,781 | B1 * | 3/2003 | Keller | E05B 17/047 70/358 |
| 7,059,160 | B2 * | 6/2006 | Keller | E05B 17/047 70/461 |
| 7,343,763 | B2 * | 3/2008 | Dolev | E05B 17/04 70/380 |
| 8,650,919 | B2 * | 2/2014 | Liu | E05B 17/2092 70/369 |
| 10,533,345 | B2 * | 1/2020 | Green | E05B 17/0054 |
| 11,655,653 | B1 * | 5/2023 | Zhang | E05B 17/047 70/277 |

FOREIGN PATENT DOCUMENTS

| | | | |
|---|---|---|---|
| EP | 0819811 | A1 | 1/1998 |
| EP | 0985787 | A2 | 3/2000 |
| EP | 2665045 | A1 | 11/2013 |
| WO | WO 2018/002569 | A1 | 1/2018 |

* cited by examiner

LOCK CYLINDER

The solution according to one or more embodiments of the present invention generally relates to the field of locks, and more particularly to an electronic lock cylinder.

As it is known to the persons skilled in the art, in the field of locks there are two main types of locks: mechanical locks and electronic locks.

The traditional mechanical type locks have by now proved to be unreliable, as they can be lock picked relatively easily by using different types of lock picking methods, such as key bumping using a milled key, picking using a lockpick, opening with a strong force power key, or also duplication of the key by wax mold or by exploiting photographs of the same that have been obtained secretly.

On the contrary, electronic locks offer greater security and reliability. However, the electronic type locks have the great disadvantage of being more expensive than the mechanical locks and of requiring an architecture such as to exhibit a sufficient space for housing the electric, electronic, optical and/or electromechanical components responsible for the operation of the lock.

These electrical, electronic, optical and/or electromechanical components include, among other things, sensors for reading electrical, magnetic and/or optical signals, logic units for calculating and checking combinations, electromechanical actuators for selective locking/unlocking, and power supply circuits.

An example of an electronic lock is the lock having the lock cylinder which is the object of the patent application EP 2665045 owned by the same applicant as the present patent application.

Electronic locks are difficult to install in doors that already include mechanical locks (for replacing them). The electronic locks require indeed to be electrically powered, but most of the mechanical locks are installed in doors that are not equipped with electric power. Consequently, to replace a mechanical type lock with a new electronic type lock, the door should be radically modified by supplying it with an electric power supply (a very expensive and impractical operation), or a complex electrical system should be provided, capable of operating without any supply of external power in the constrained space corresponding to the lock cylinder of the previous mechanical type lock, for example providing a low-consumption electrical system capable of operating with one or more batteries that do not require a too frequent replacement.

With particular reference to electronic locks based on a rotary drum architecture, or cylinder locks, they generally comprise a lock cylinder comprising an outer casing which rotatably houses in its interior pivotable pins provided with a seat for the key, and a revolving plug (also known as a rotary cam or simply lever) which can be coupled to the pins for actuating the lock bolt. The pins and the revolving plug occupy a large part of the lock cylinder, leaving little room for the installation of the electrical, electronic, optical, and/or electromechanical components responsible for the operation of the lock. In particular, in known lock cylinders, a groove is provided which defines a dedicated hollow space to allow the rotary movement of the revolving plug. Having the revolving plug protrude from the outer casing of the lock cylinder to a sufficient extent to be able to engage the bolt of the lock during rotation, this groove has to have a rather large size, greatly reducing the space available for housing the electrical, electronic, optical, and/or electromechanical components. Moreover, due to the non-negligible dimension of the groove dedicated to allow the rotary movement of the revolving plug, the overall sturdiness of the lock cylinder is negatively affected, thus compromising its reliability and safety with respect to lock picking and tampering attempts.

The problem relating to sturdiness is exacerbated by the fact that the lock cylinders are provided with a through hole suitable for being traversed by a retaining screw which allows the lock cylinder to be fixed within the lock. Having to adapt to different lock models, the position and size of this hole are standard. According to the most common specifications, the hole is positioned right below the above-mentioned groove dedicated to the rotational movement of the revolving plug, weakening still more the overall sturdiness of the lock cylinder. For example, according to the regulation DIN 18252: 2018-05 for mechatronic cylinders:

- the revolving plug extends from its rotation axis for an extension of about 15 mm (consequently, the groove necessary to allow the rotation of the revolving plug has an extension with respect to this rotation axis which is at least greater than 15 mm), and
- the hole has a radius of 2.5 mm, and its center is positioned below the groove at a distance of about 19 mm from the rotation axis.

With the aforementioned values, the full portion which the lock cylinder has between the hole and the groove has a thickness of only 1.5 mm. This reduced thickness is a serious weak point, since it can be broken with relative ease by a burglar who is able to grasp the lock cylinder from the outside (using the burglary technique known as "snapping") by exploiting the fact that the lock cylinders usually protrude outwards when the lock is installed in an armoured door.

In order to reduce the possibility of such attacks having effect, the known solutions provide for the installation of external covers to prevent the lock cylinder from being gripped from the outside, and/or the provision of an anti-tear bar.

The problem underlying the present invention is that none of the known solutions in the state of the art allows to obtain a robust electronic lock cylinder having the same overall dimensions as a standard mechanical lock cylinder (i.e. capable of being directly installed in the place of said mechanical lock cylinder in order to replace the latter) and at the same time allows the housing of all the electric, electronic, optical, and/or electromechanical components required for the operation of the lock in an effective manner, i.e., having such an architecture to be able to reduce the number of components to a minimum, consequently reducing costs and the consumption of electric power, without incurring reductions in resistance to lock picking.

WO2018002569 discloses a cam assembly for a lock. The cam assembly comprises a rotatable cam with a radially extendable and retractable blade. The blade is moved between fully extended and fully retracted positions during one revolution of the cam. Preferably, the position of the blade relative to the cam is controlled by a follower that travels along a profiled surface of a closed pathway as the cam rotates against the force of a biasing means acting on the blade. The closed pathway may be defined by a component located adjacent the cam that is stationary with respect to the cam and the follower comprises a projection such as a pin carried by the blade Also provided is a cylinder lock incorporating such a cam assembly or comprising such a cam arrangement wherein the component is integral with a casing forming part of the cylinder lock.

An object of the present invention is therefore to provide an electronic lock cylinder with increased sturdiness and having a size such as to be easily installed in the place of the traditional cylinders for mechanical locks and which can house the electric, electronic and optical, and/or electromechanical therein in an effective manner, being resistant to attempts at lock-picking and tampering, and having relatively low manufacturing costs.

In very general terms, the solution according to one or more embodiments of the present invention is based on the idea of providing a lock cylinder having a revolving plug configured in such a way that the distance between the portion of the driving tooth of the revolving plug is suitable to engage the latch and the rotation axis of the revolving plug itself in function of the rotation angle of the revolving plug.

One aspect of the present invention relates to a lock cylinder.

The lock cylinder is adapted to be installed in a lock comprising a lock bolt for driving the lock bolt.

Said lock cylinder comprises a cylinder housing.

Said lock cylinder comprises a revolving plug comprising a rotor element adapted to rotate with respect to the cylinder housing about a rotation axis within a rotation support.

Said revolving plug comprises a driving tooth for the lock bolt comprising an engage portion adapted to engage the lock bolt.

Said driving tooth is rotatable about the rotation axis together with the rotor element and is coupled to the rotor element in such a way the operative distance between the engage portion of the driving tooth and the rotation axis varies, while rotating about the rotation axis, as a function of the rotation angle of the rotor element with respect to the cylinder housing.

When the lock cylinder is installed in the lock:

- said operative distance has one among a plurality of first values when the rotation angle of the rotor element belongs to a first angular interval corresponding to a position of the engage portion of the driving tooth that is proximal to the lock bolt; and
- said operative distance has one among a plurality of second values when the rotation angle belongs to a second angular interval corresponding to a position of the engage portion of the driving tooth that is distal to the lock bolt, each of said first values being higher than each of said second values, wherein:

When the lock cylinder is installed in the lock, the lock cylinder is located below the lock bolt along a first direction substantially perpendicular to the rotation axis.

The driving tooth is slidingly housed within a seat which is radially provided in the rotation element and which defines at least one side opening of the rotor element perpendicular to the rotation axis.

The driving tooth is provided with at least one engage element which protrudes from a side opening along a direction parallel to the rotation axis, and adapted to slidingly engage guide profiles provided on the rotation support.

Said guide profiles defines for said at least one engage element an overall guide profile having an eccentric shape arranged to support from below along said first direction said at least one engage element when the rotation angle of the rotor element belongs to both the first angular interval and to the second angular interval.

Said overall guide profile is adapted to cause said variation of the operative distance as a function of the rotation angle of the rotor element with respect to the cylinder housing.

According to an embodiment of the present invention, said overall guide profile defined by said guide profiles is a discontinuous guide profile.

According to an embodiment of the present invention, said guide profiles defining said overall guide profile comprise first guide profiles and second guide profiles, said first guide profiles and said second guide profiles being separated and spaced apart from each other.

According to an embodiment of the present invention, said first guide profiles are arranged to support from below along said first direction said at least one engage element when the rotation angle of the rotor element belongs to the first angular interval.

According to an embodiment of the present invention, said second guide profiles are arranged to support from below along said first direction said at least one engage element when the rotation angle of the rotor element belongs to the second angular interval.

According to an embodiment of the present invention, the revolving plug is configured in such a way that, when the lock cylinder is installed in the lock:

- the driving tooth is in a maximum extension configuration wherein said operative distance is equal to the highest one among said first values when the rotation angle is included in at least one corresponding portion of the first angular interval corresponding to a position of the engage portion of the driving tooth that is substantially faced toward the lock bolt;
- the driving tooth is in a minimum extension configuration wherein said operative distance is equal to the lowest one among said second values when the rotation angle is included in at least one corresponding portion of the second angular interval corresponding to a position of the engage portion of the driving tooth that is substantially faced along a direction that is opposite to the lock bolt.

According to an embodiment of the present invention, the cylinder housing comprises a groove which extends from the rotation axis along the first direction for a value lower than the highest among said first values of said operative distance.

According to an embodiment of the present invention, the lock cylinder is a European type cylinder and said vale for which said groove extends from the rotation axis along the first direction (y) is lower than 16.5 mm, preferably lower than 10 mm, still more preferably equal to 8.5 mm.

According to an embodiment of the present invention, the lock cylinder further comprises at least one driving pin provided with a respective key seat configured for receiving a key, and housed in the cylinder housing in such a way to be rotatable inside the cylinder housing about the rotation axis.

According to an embodiment of the present invention, the lock cylinder further comprises a selective coupling structure configured for the rotational selective coupling between said at least one driving pin and the rotor element.

According to an embodiment of the present invention, said selective coupling structure comprises, for the at least one driving pin a respective plug element configured in such a way to be inserted from a first side into an insertion hole located in the corresponding driving pin, and from a second side opposite to said first side into a hole located in the rotor element, said plug element being free of move within said holes along the rotation axis under the push action of the key during the insertion of the key within the respective key seat.

According to an embodiment of the present invention, said driving tooth comprises an eyelet, said plug element being configured in such a way to be inserted from said second side into said eyelet.

According to an embodiment of the present invention, said eyelet is a radially elongated hole or slot.

According to an embodiment of the present invention, the lock cylinder further comprises a rotation block mechanism adapted to selectively prevent the rotation of the at least one driving pin as a function of the correctness or not of an lock unlocking combination present on the key.

According to an embodiment of the present invention, said at least one driving pin comprises two driving pins aligned along the rotation axis, the revolving plug being located between the two driving pins.

According to an embodiment of the present invention, said rotation block mechanism comprises a linear slide comprising two stop elements adapted to engage corresponding stop seats located on the driving pins.

According to an embodiment of the present invention, the lock cylinder further comprises an electromechanical actuator adapted to move the linear slide along a direction parallel to the rotation axis as a function of the correctness or not of the lock unlocking combination present on the key.

These and other features and advantages of the solution according to the present invention will be better understood by reading the following detailed description of an embodiment thereof, provided only by way of a non-limiting example, to be read in combination with the attached drawings, in which.

Figure 1:
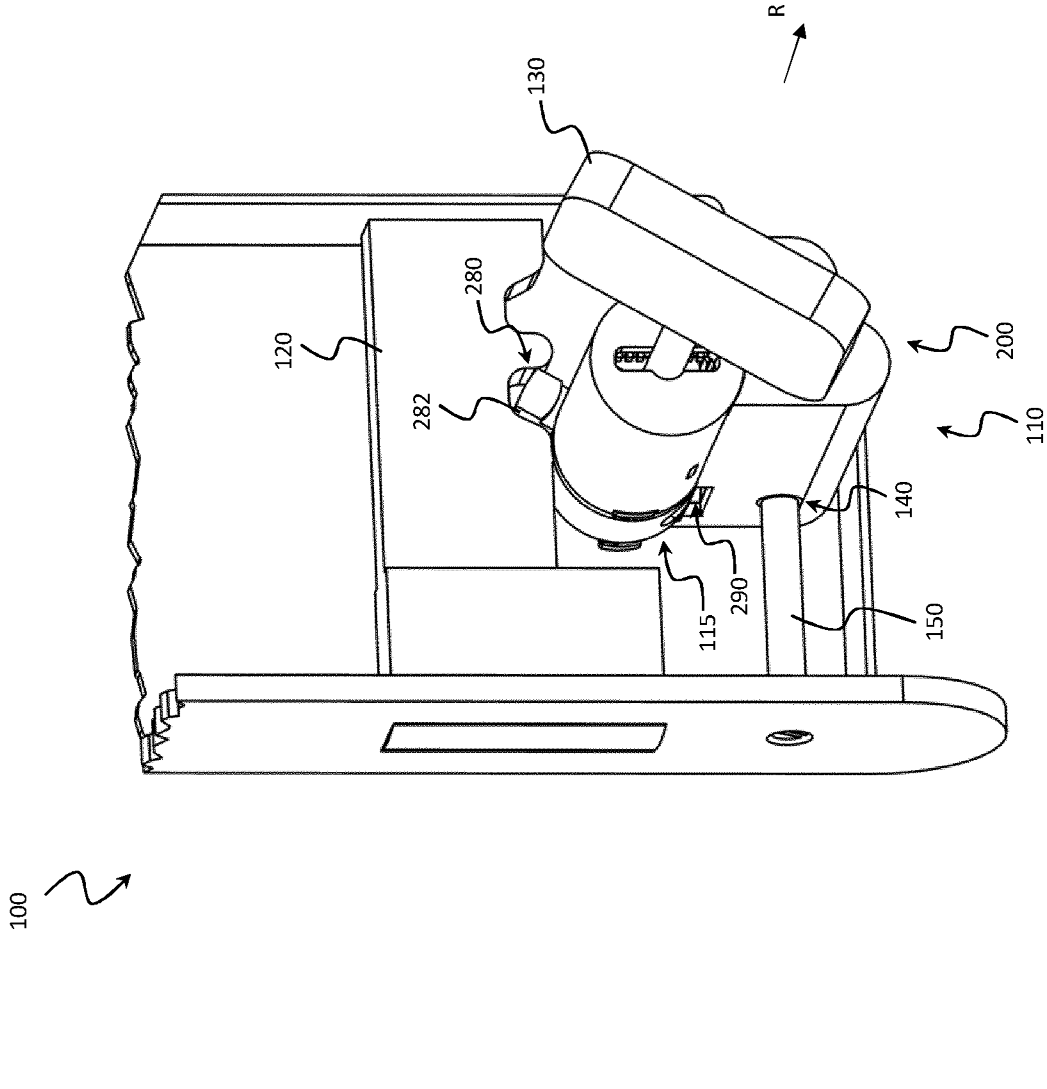
FIG. 1 is a perspective view of an electronic lock comprising a lock cylinder in accordance with an embodiment of the present invention.

With particular reference to the figures, which all share the same reference system identified by the three orthogonal directions x, y and z, in FIG. 1 an electronic lock 100 is shown according to a perspective view comprising a lock cylinder 110 in accordance with an embodiment of the present invention.

The lock cylinder 110 extends along a longitudinal axis parallel to the direction x, and comprises a revolving plug (in jargon also known as cam or lever) 115 able to rotate about itself about an rotation axis R parallel to the direction x for driving the movement of a lock bolt 120 along the direction z when a key 130 (recognized to be correct by the cylinder itself) is inserted into the lock cylinder 110 and rotated about the longitudinal axis.

The lock cylinder 110 is also provided with a through hole 140 able to be traversed by a retaining screw 150 for fixing the lock cylinder 110 within the lock 100.

Figure 2A:
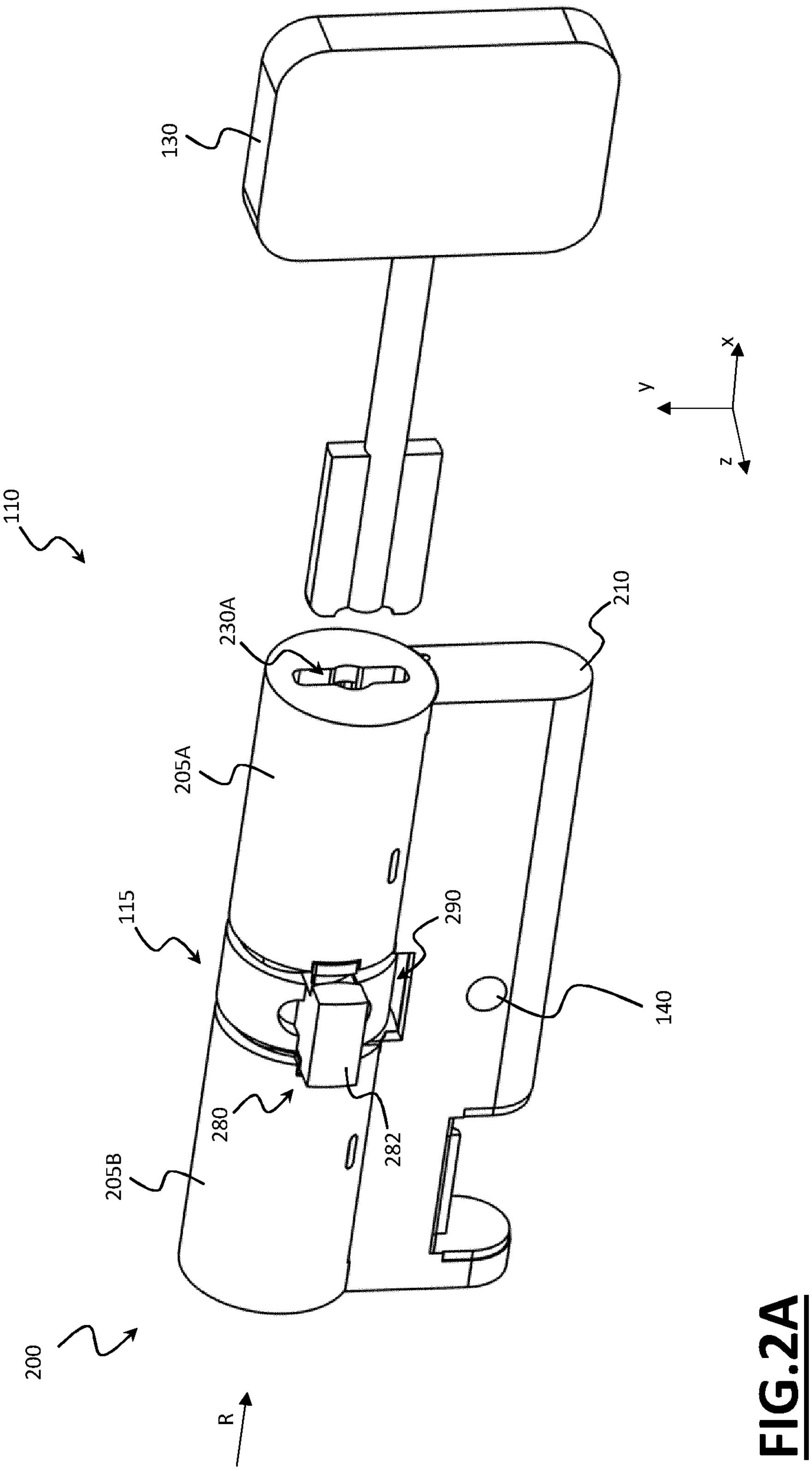
FIG. 2A is a perspective view of the lock cylinder of FIG. 1 in accordance with an embodiment of the present invention in which the key is shown completely removed from the lock cylinder itself.
Figure 2B:
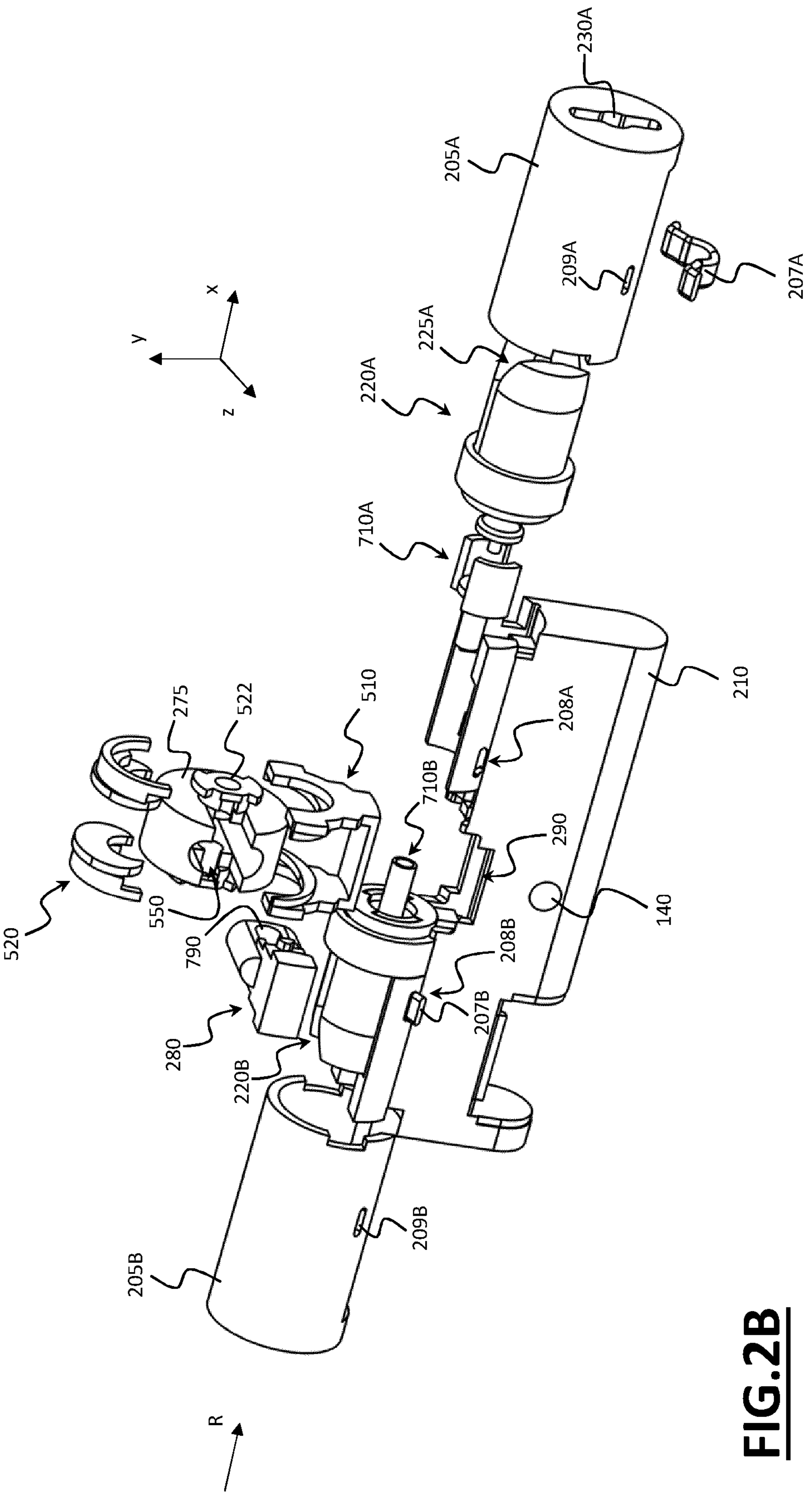
FIG. 2B is a partially exploded view of the lock cylinder of FIG. 2A.
Figure 2C:
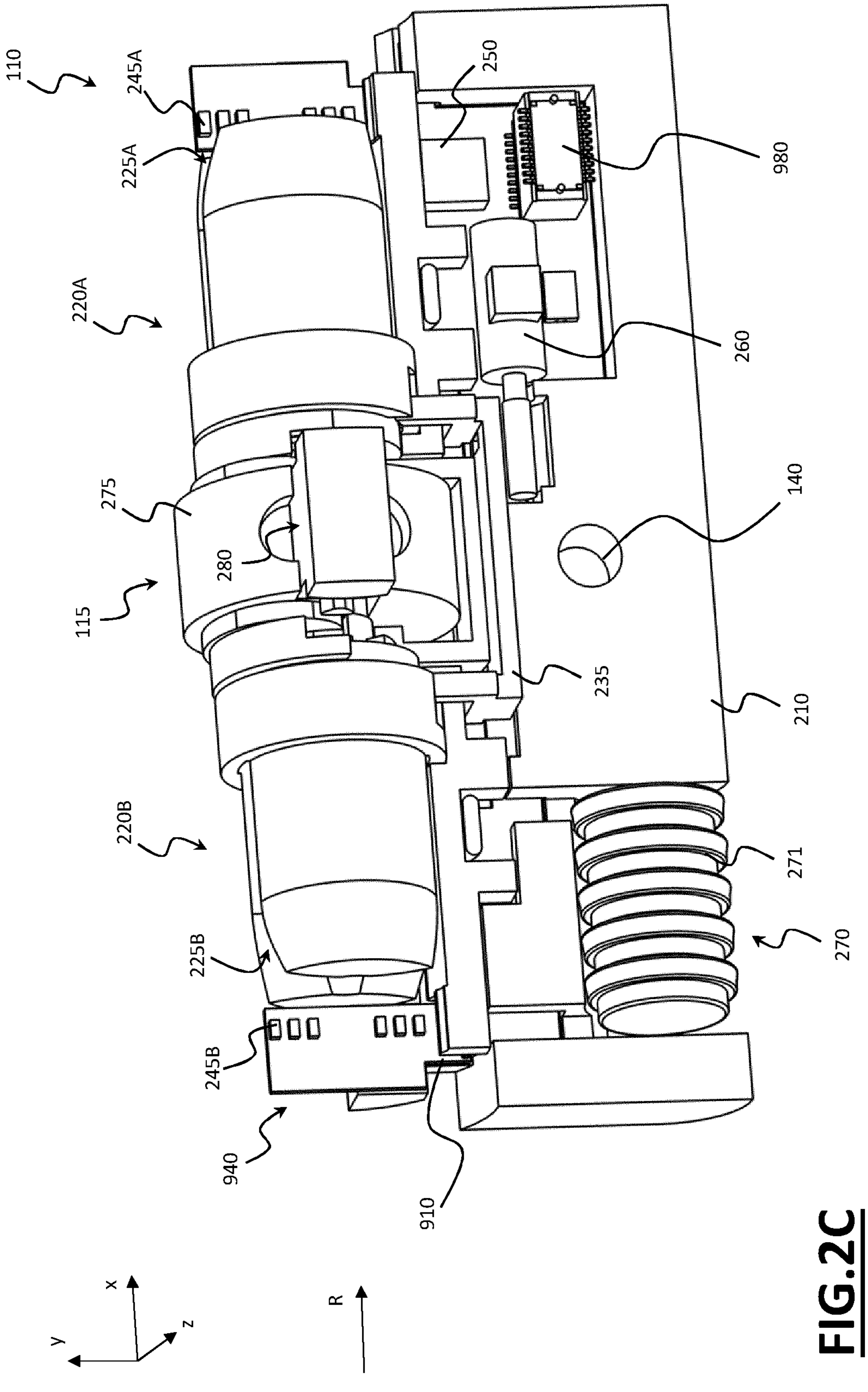
FIG. 2C is a perspective view of the cylinder lock of FIGS. 2A and 2B partially in section.

In order to describe in detail the main elements of the lock cylinder 110 in accordance with the embodiments of the present invention, reference will be made to FIGS. 2A, 2B, and 2C. FIG. 2A is a perspective view of the lock cylinder 110 in accordance with an embodiment of the present invention in which the key 130 is shown fully extracted from the lock cylinder 110; FIG. 2B is a partially exploded view of the same lock cylinder 110 of FIG. 2A; FIG. 2C is a perspective view of the lock cylinder 110 of FIGS. 2A and 2B, partially in section according to a plane parallel to the directions x and y.

As it is known to the person skilled in the art, with the term of lock cylinder it is meant in general a mechanical system comprising mechanisms for the recognition of the correctness of a key inserted therein and the authorization of the rotation of the revolving plug with respect to the outer casing of the cylinder.

The lock cylinder 110 in accordance with embodiments of the present invention comprises an external cylinder housing 200 within which the mechanical, electric, electronic, optical, and/or electromechanical components of the lock cylinder 110 are housed.

In the embodiment shown in the figures, the cylinder housing 200 comprises an upper section where the main mechanical components of the lock cylinder 110 are housed, and a lower section having both a structural reinforcement function to increase the overall sturdiness of the lock cylinder 110 and a container function for the accommodation of the majority of a control system comprising the various electric, electronic, optical, and/or electromechanical components for the operation of the lock cylinder 110 (as will become clearer hereafter in the present description, some electronic components may still be housed at the upper section). The through hole 140 is made in the lower section of the cylinder housing.

According to an embodiment of the present invention, the upper section of the cylinder housing 200 comprises two upper covers 205A, 205B having substantially a hollow cylindrical shape, adapted to be mounted on the upper part of the lower section, identified in the figures by reference 210.

According to an embodiment of the present invention, the two upper covers 205A, 205B are advantageously adapted to be mounted on the upper part of the lower section in a sliding manner along the direction x. In accordance with an embodiment of the present invention, each of the two upper covers 205A, 205B is able to be advantageously kept in place when mounted on the upper part of the lower section by means of a respective elasting fastening element 207A, 207B. In the embodiment of the invention shown in the figures, the elastic fastening elements 207A, 207B are substantially in a U-shaped form and have side ends extending along the directions y and z which are suitable for engaging corresponding slots 208A, 208B made on the upper part of the lower section of the cylinder housing 200 and corresponding slots 209A, 209B made on the upper covers 205A, 205B. When the two upper covers 205A, 205B are mounted on the upper part of the lower section of the cylinder housing 200, with each of the slots 208A, 208B which is aligned with a respective slot 209A, 209B, the elasting fastening element 207A simultaneously engages the slots 208A and 209A, while the elasting fastening element 207B simultaneously engages the slots 208B and 209B. In this way, the two upper covers 205A, 205B are advantageously constrained to the upper part of the lower section of the cylinder housing 200, and can no longer be removed along the x direction.

In accordance with an embodiment of the present invention, the cylinder lock 110 includes drive pins 220A, 220B accommodated in the cylinder housing and able to rotate inside of the latter around the rotation axis R. Each driving pin 220A, 220B is provided with a respective key seat 225A, 225B arranged to receive the key 130. During operation, each driving pin 220A, 220B is enclosed within a respective upper cover 205A, 205B. A respective key opening 230A, 230B is provided on each of said upper covers 205A, 205B, which acts as a keyhole of the electronic lock 100 and through which the key 130 can be inserted in the respective key seat 225A, 225B.

Advantageously, the upper covers 205A, 205B are configured in such a way that, once mounted on the upper part of the lower section of the cylinder housing 200 and fixed to the latter by means of the elastic fastening elements 207A, 207B, the front portion (parallel to the directions y and x) of each upper cover 205A, 205B which is facing the outside of the lock 100 is formed by elements that are not movable or that are at least integral.

In accordance with an embodiment of the present invention, the peculiar conformation of the elastic fastening elements 207A, 207B allows to carry out the further function of facilitating an angular positioning of the driving pins 220A, 220B such that the key seats 225A, 225B vertically extend (along the y direction) during the insertion or removal of the key 130.

In the embodiment of the present invention illustrated in FIGS. 2A-2C, the lock cylinder 110 comprises two driving pins 220A, 220B aligned along the rotation axis R with the respective key seats 225A, 225B facing towards opposite ends of the cylinder of lock 110, so as to be operable one by inserting the key 130 for example from the outside of a room (for example, of a house or shop or warehouse or office), and the other one from the inside thereof. The revolving plug 115 is disposed between the two driving pins 220A, 220B, and shares with them the same rotation axis R. As visible in FIGS. 2A and 2C, when hooked to the lower section 210, the upper covers 205A, 205B have an extension (along the direction x) such as to leave uncovered the revolving plug 115.

It is emphasized that the concepts of the present invention can also be applied to the case in which only one driving pin is present, that is in the case in which it is possible to insert the key 130 only at one side of the door in which the lock 100 is installed. Similar considerations can also be applied to the case in which the lock cylinder 110 is a so-called "half cylinder", i.e., a lock cylinder, half of which has a simple rotating knob in place of a driving pin, so as to allow the opening of the lock without using a key at one side of the door where the lock is installed.

As will be described in greater detail in the following description, in accordance with an embodiment of the present invention, each driving pin 220A, 220B can be selectively coupled exclusively with the revolving plug 115, so as to be able to transfer the rotary movement of this driving pin 220A, 220B also to the revolving plug 115, when the correct key 130 has been inserted in the key seat 225A, 225B corresponding to this driving pin 220A, 220B.

The lock cylinder 110 according to an embodiment of the present invention is a lock cylinder for an electronic lock adapted to receive a key 130 on which the reproduction of a lock unlocking combination is present.

In accordance with an embodiment of the present invention, the lock cylinder 110 is provided with a rotation block mechanism 235 adapted to selectively prevent the rotation of both or of only one of the driving pins 220A, 220B (and therefore of the revolving plug 115) depending on whether the lock unlocking combination present on the key 130 is correct. As will be described in greater detail in the following of the description, the rotation block mechanism 235 comprises movable mechanical parts adapted to be moved by an electromechanical actuator driven on the basis of the lock unlocking combination present on the key 130 inserted in one of the key seats 225A, 225B.

In accordance with an embodiment of the present invention, the lock cylinder 110 comprises a control system comprising at least the following electric, electronic, optical, and/or electromechanical components:

- reading sensors 245A, 245B configured to detect, through exchange of electrical and/or magnetic and/or optical signals, the lock unlocking combination present on the key 130 when this key 130 is inserted in the lock cylinder 110;
- a logic unit 250 programmed to receive output signals from the reading sensors 245A, 245B, check on the basis of them whether the lock unlocking combination present on the key 130 corresponds to a predetermined combination stored in the logic unit 250 (or in a memory unit coupled to it) and, in the affirmative case, to generate an unlocking signal adapted to allow the rotation of one of the driving pins 220A, 220B (in particular, of the driving pin having the key seat 225A, 225B within which the key 130 storing the correct combination has been inserted);
- an electromechanical actuator 260 adapted to receive the unlocking signal from the logic unit 250 and to move the rotation block mechanism 235 so as to enable the rotation of one of the driving pins 220A, 220B or to prevent the rotation of both on the base of the received unlocking signal;
- a supply unit (not shown in the figures) designed to supply voltages to the various electric, electronic and electromechanical components of the control system of the lock cylinder.

In accordance with an embodiment of the present invention, the lock cylinder 110 further comprises a battery housing 270 suitable for receiving one or more electric batteries 271, for example one or more button batteries connected in series, suitable for supplying electric power to the power supply unit.

Alternatively or in addition to the battery housing, the lock cylinder 110 can also be provided with a power socket (not shown), for example a USB port, adapted to be connected with an external power supply source, for example an external USB power supply.

According to an embodiment of the present invention, the control system of the lock cylinder and all or at least a part of the electric, electronic, optical, and/or electromechanical components of the control system are located on two printed circuit boards ("PCB") facing one another parallel to the x and y directions inside the cylinder housing 200.

In accordance with an embodiment of the present invention, the reading sensors 245A, 245B preferably comprise emitters arranged to emit detection radiations (for example, LEDs) and receivers arranged to receive the detection radiations (for example, photodiodes, phototransistors, photocells, photodetectors CCD) filtered by the key 130 inserted in the key seat 225A, 225B. In this regard, the key 130 is arranged to filter the detection radiations emitted by the emitters of the reading sensors 245A, 245B so as to generate a lock unlocking combination. For example, in accordance with an embodiment of the present invention, the key 130 comprises a plurality of windows (not shown), some of which are transparent to the detection radiations (the number and position of these transparent windows defining the lock unlocking combination). A possible example of reading sensors 245A, 245B and corresponding key 130 is described in the aforementioned patent application EP 2665045 owned by the same applicant as the present patent application.

In accordance with embodiments of the present invention, the revolving plug 115 comprises a cylindrical rotor element 275 able to rotate around the rotation axis R and a driving tooth of the bolt 280 (henceforth, simply identified as an driving tooth 280) constrained in rotation with the rotor element 275. The driving tooth 280 comprises an engage portion 282 adapted to engage the lock bolt 120 to cause the movement of the latter.

In accordance with an embodiment of the present invention, the driving tooth 280 is coupled to the rotor element 275 in such a way that the distance of the engage portion 282 of the driving tooth 280 from the rotation axis R (hereinafter referred to as "operative distance") varies, as rotating around the rotation axis R, as a function of the rotation angle of the rotor element 275 with respect to the cylinder housing 200.

In accordance with an embodiment of the present invention, the revolving plug 115 is configured so that the operative distance between the engage portion 282 of the driving tooth 280 and the rotation axis R satisfies the following condition.

When the rotation angle of the rotor 275 belongs to a first angular interval A1 corresponding to a position of the engagement portion 282 proximal to the lock bolt 120 (i.e., in which the driving tooth 280 appears to be at least partially facing upward), the operative distance is greater than the operative distance resulting when the rotation angle of the rotor 275 belongs to a second angular interval A2 corresponding to a position of the engagement portion that is distal to the lock bolt 120 (i.e., in which the driving tooth 280 is at least partially facing downward).

In particular, according to an embodiment of the present invention, the revolving plug 115 is configured in such a way that:

- The driving tooth 280 is in a maximum extension configuration, that is with the driving tooth 280 that is extracted from the rotor element 275 and in which the distance of the engage portion 282 of the driving tooth 280 from the rotation axis R is maximum, when the rotation angle of the rotor element 275 is included in at least a portion P1 of the first angular interval A1. In particular, in the maximum extension configuration, the engage portion 282 of the driving tooth 280 is substantially directed towards the overlying lock bolt 120.
- The driving tooth 280 is in a minimum extension configuration, that is with the driving tooth 280 that is retracted inside the rotor element 275 and in which the distance of the engage portion 282 of the driving tooth 280 from the rotation axis R is minimal, when the rotation angle of the rotor element 275 is included in at least one portion P2 of the second angular interval A2. In particular, in the minimum extension configuration, the engage portion 282 of the driving tooth 280 is substantially directed along the direction opposite to the overlying lock bolt 120.

In accordance with an embodiment of the present invention, the driving tooth 280 of the revolving plug 115 is constrained in rotation with the rotor element 275 and at the same time is movable in translation along a radial direction with respect to the rotation centre of the rotor element 275. In other words, the revolving plug 115 according to an embodiment of the present invention is provided with a driving tooth 280 which rotates together with the rotor element 275 but which at the same time moves radially with respect to the centre of the rotor element 275. With the aim of describing the revolving plug 115 in greater detail in accordance with this embodiment of the present invention, reference will now be made in particular to FIGS. 3A-3C and to FIGS. 4A-4C.

Figure 3A:
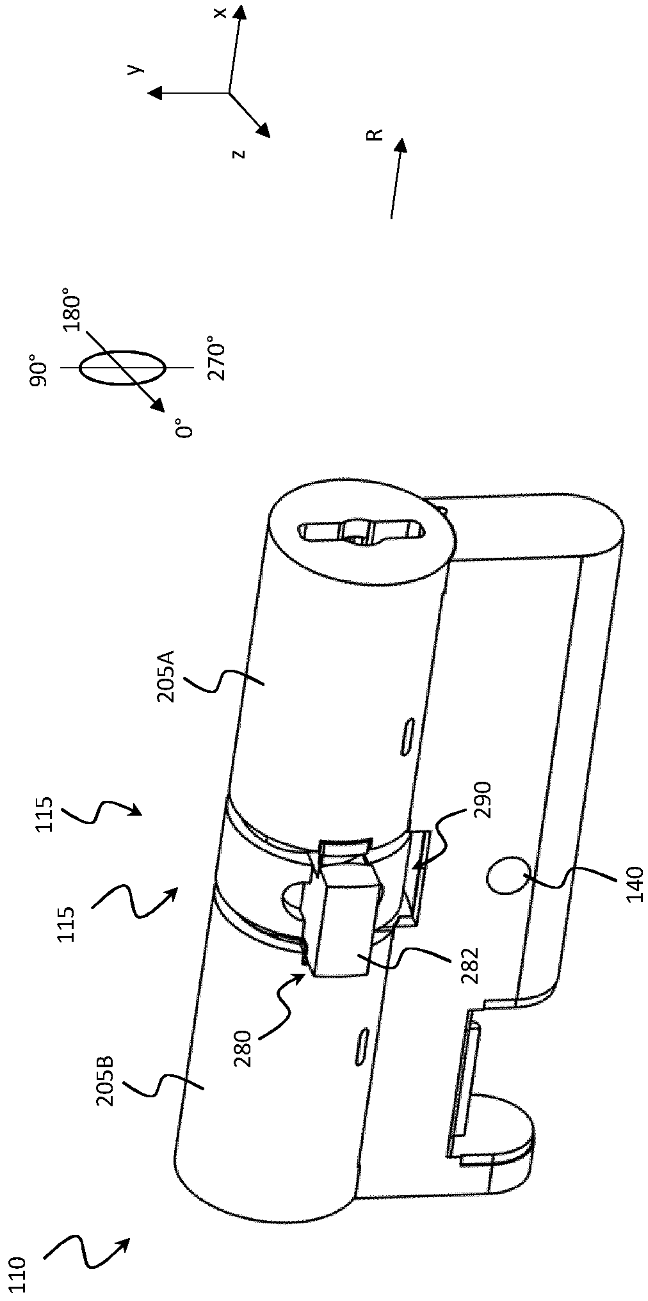
FIG. 3A is a perspective view of the lock cylinder in accordance with an embodiment of the present invention with the driving tooth of the revolving plug that is in a rest configuration.
Figure 3B:
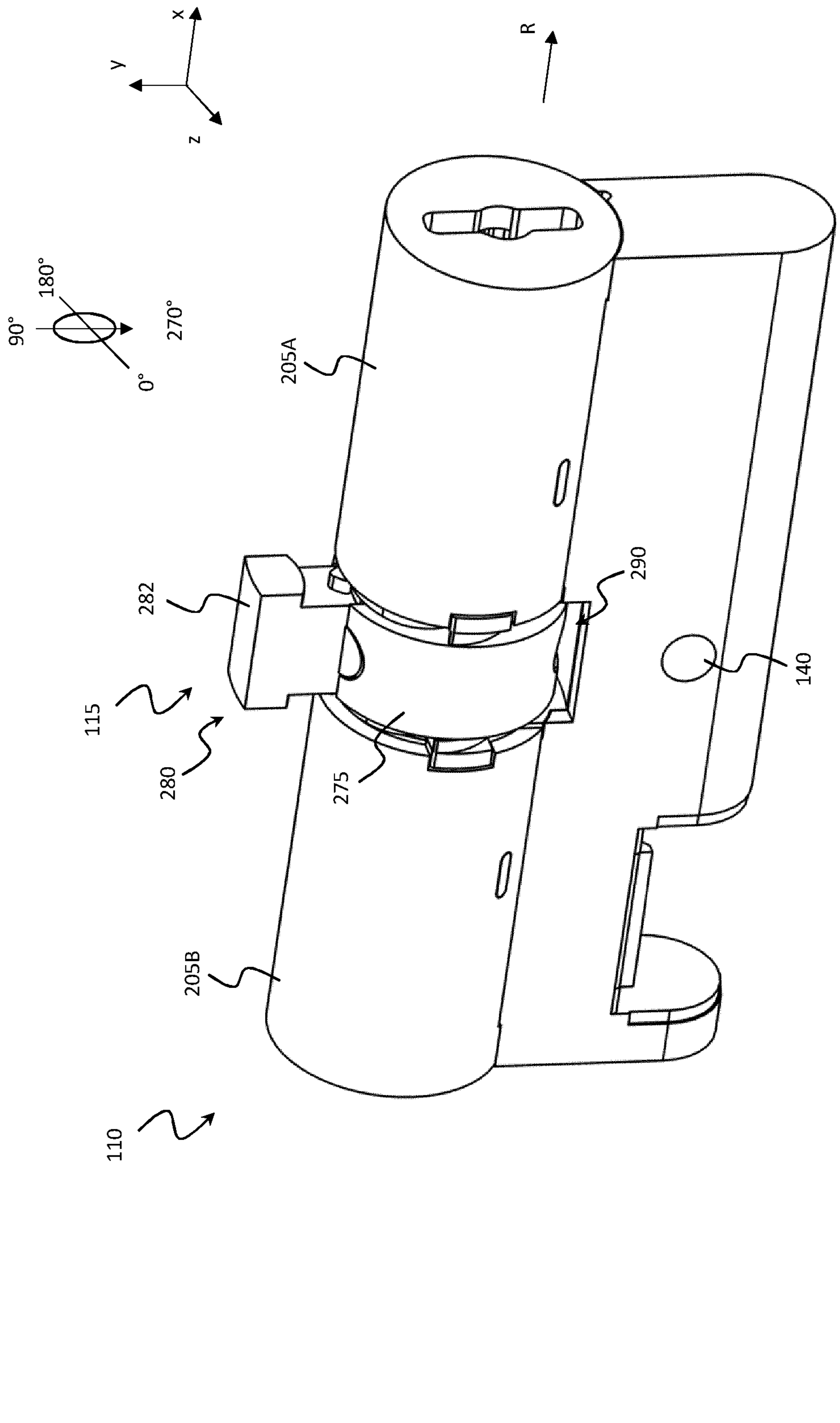
FIG. 3B is a perspective view of the lock cylinder in accordance with an embodiment of the present invention with the driving tooth of the revolving plug that is in a maximum extension configuration.
Figure 3C:
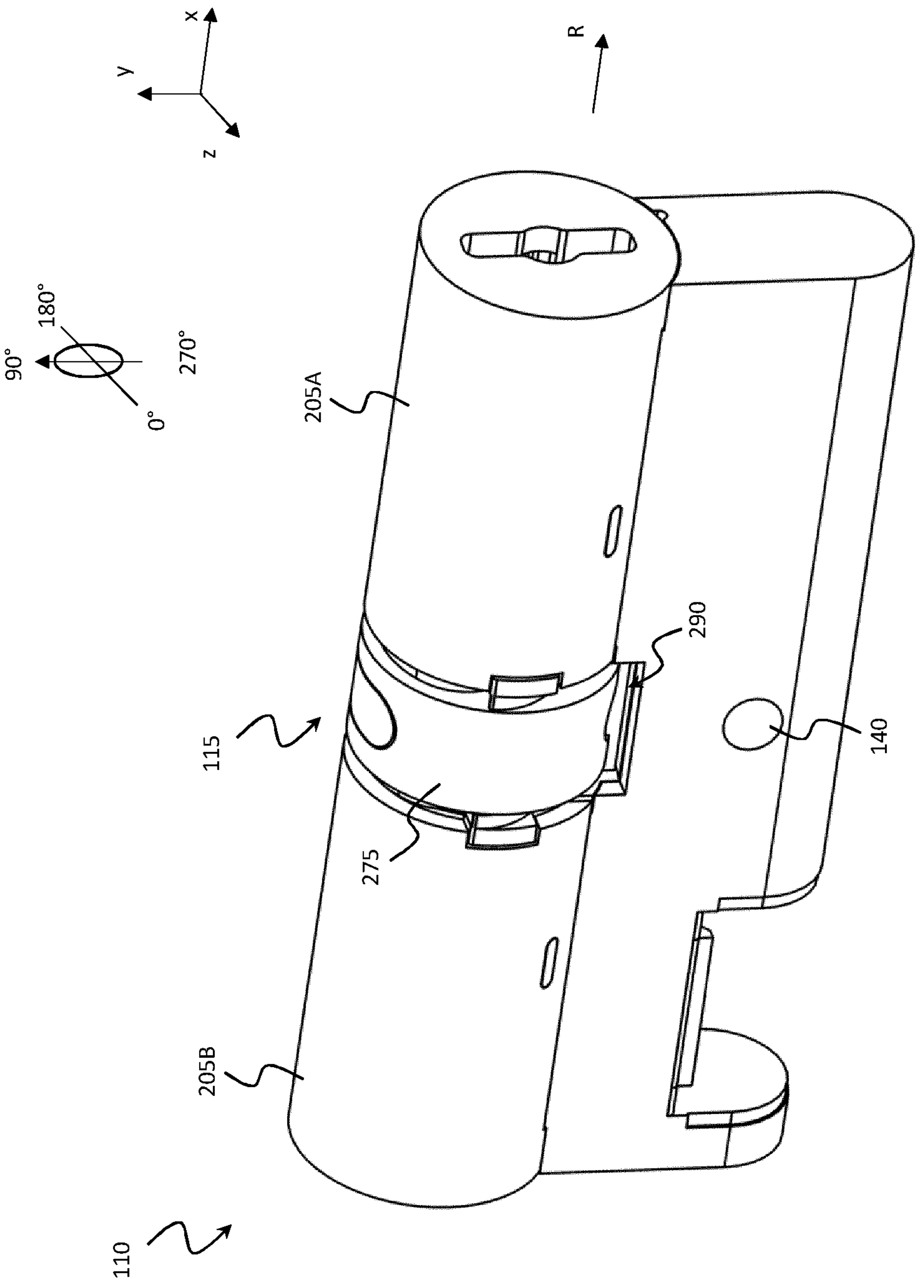
FIG. 3C is a perspective view of the lock cylinder in accordance with an embodiment of the present invention with the driving tooth of the revolving plug that is in the minimum extension configuration.
Figure 4A:
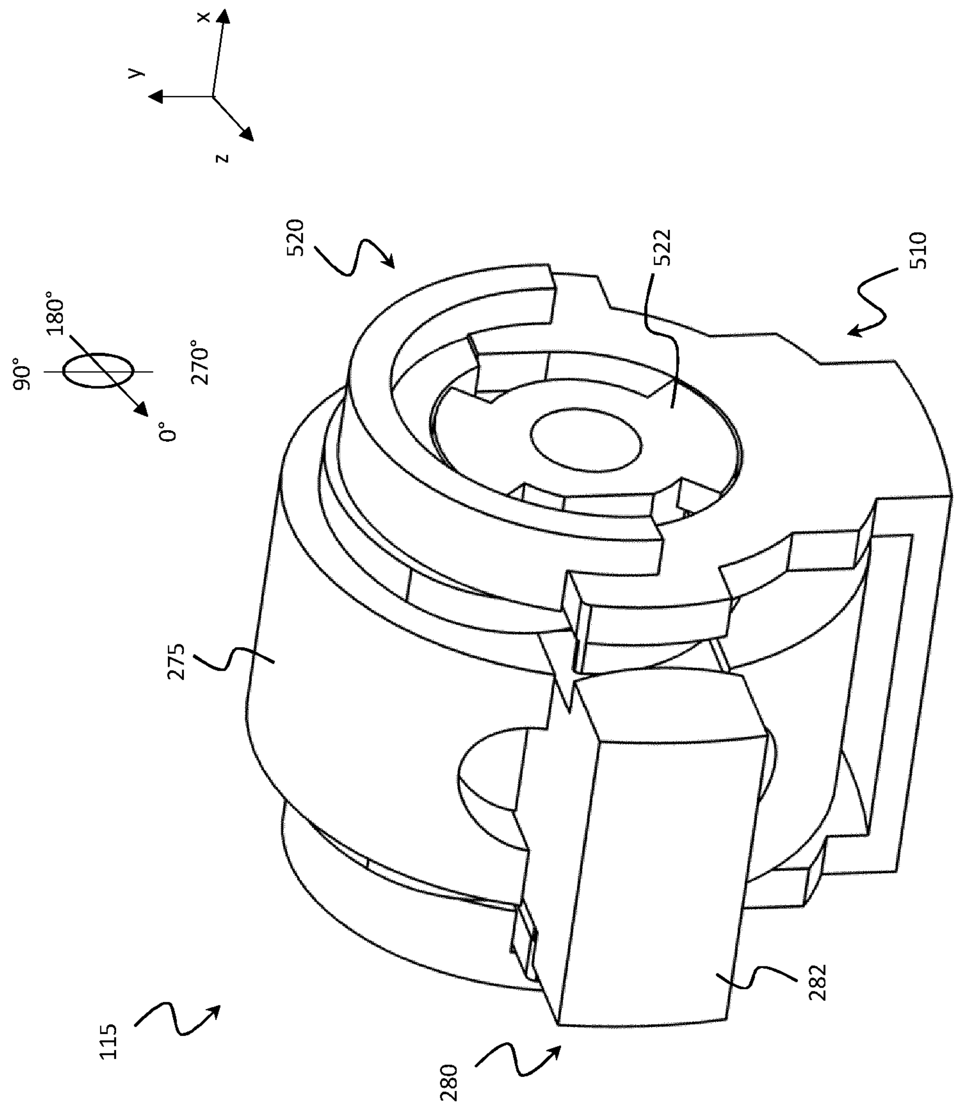
FIGS. 4A-4C are perspective views of the revolving plug illustrated in FIGS. 3A-3C, respectively, wherein the revolving plug is partially isolated from the rest of the lock cylinder.
Figure 4B:
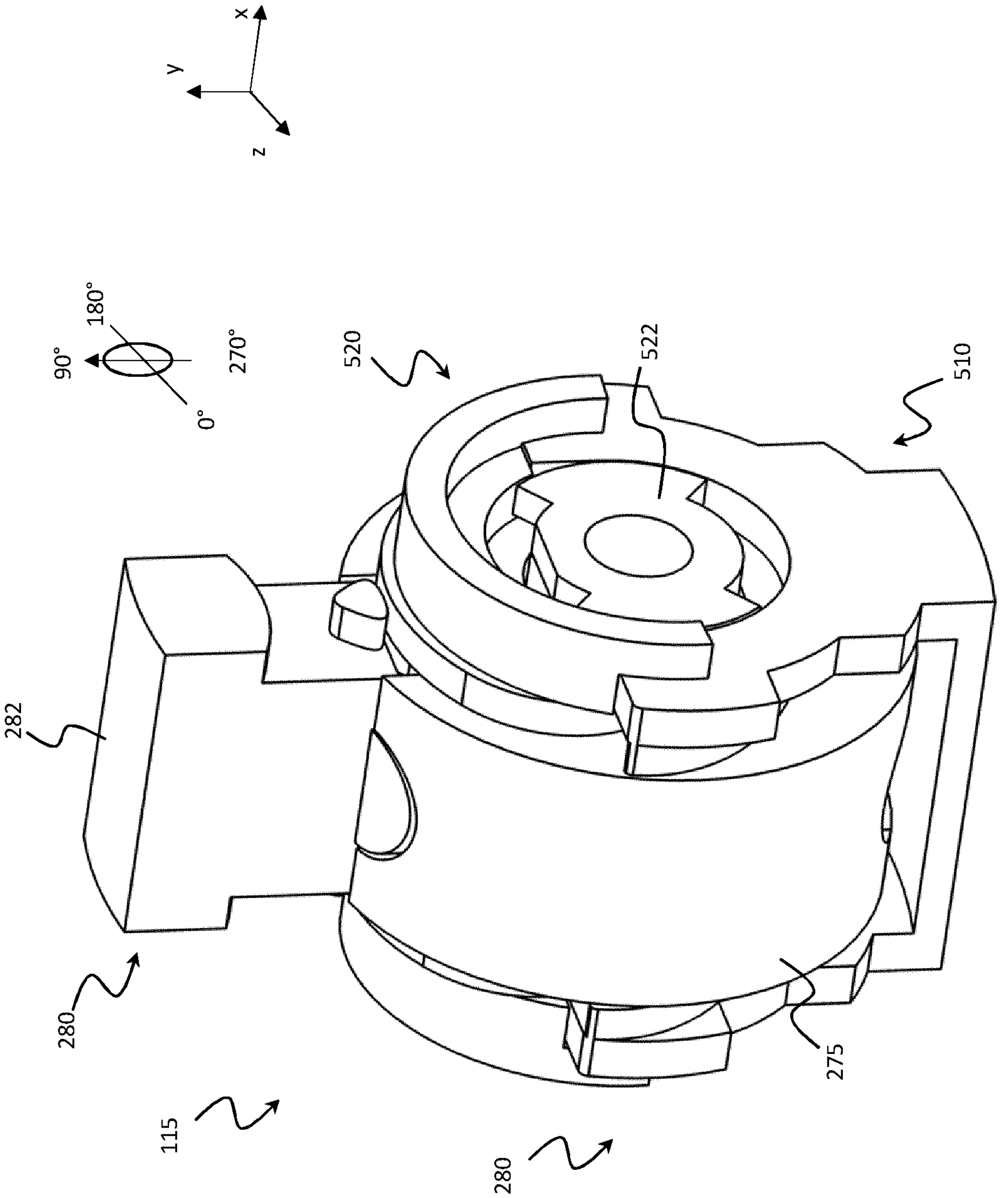
Figure 4C:
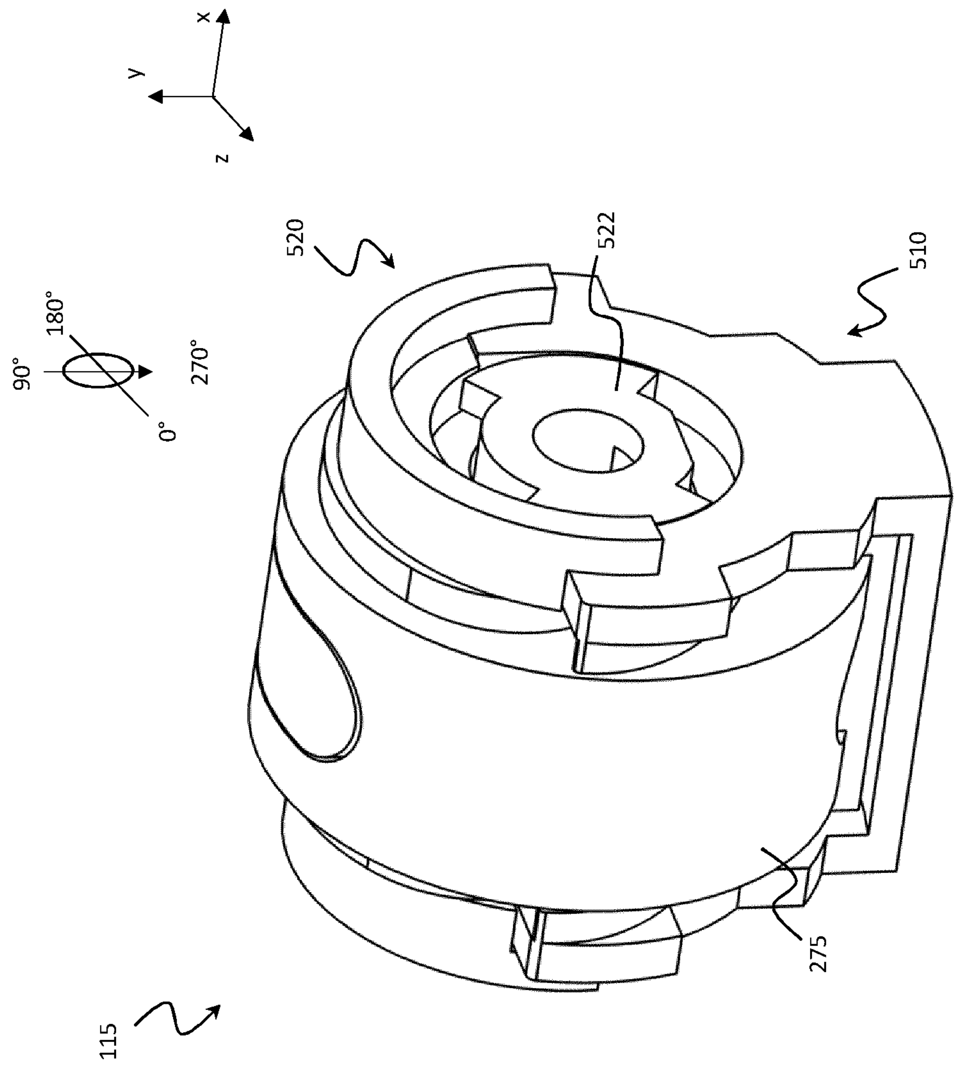

The FIG. 3A is a perspective view of the lock cylinder 110 with the driving tooth 280 of the revolving plug 115 which is in a rest configuration, i.e., with the rotor element 275 having a rotation angle (rotation angle equal to 0°) such that the driving tooth 280 is aligned along the z-direction. The FIG. 3B is a perspective view of the lock cylinder 110 with the driving tooth 280 of the revolving plug 115 that is in a maximum extension configuration, i.e., with the rotor element 275 having a rotation angle (rotation angle equal to 90°) such that the driving tooth 280 is aligned along the y direction and facing upwards. The FIG. 3C is a perspective view of the lock cylinder 110 with the driving tooth 280 of the revolving plug 115 that is in the minimum extension configuration, i.e., with the rotor element 275 having a rotation angle (rotation angle equal to 270°) such that the driving tooth 280 is aligned along the y direction and facing downward (and at the same time is at least partially retracted inside the rotor element 275). The FIGS. 4A-4C are perspective views of the revolving plug 115 illustrated in FIGS. 3A-3C, respectively, wherein the revolving plug is partially insulated from the rest of the lock cylinder 110.

With reference to the angular reference system used in FIGS. 3A-3C and 4A-4C, in accordance with the exemplary embodiment of the present invention:

- the first angular interval A1 corresponding to a position of the engage portion 282 proximal to the lock bolt 120 (i.e., in which the driving tooth 280 is at least partially turned upward) extends from a value slightly greater than 0° to a value slightly lower than 180°;
- the second angular interval A2 corresponding to a position of the engage portion 282 distal to the lock bolt 120 (i.e., in which the driving tooth 280 is at least partially turned downward) extends from a value slightly greater than 180° to a value slightly lower than 360°;
- the portion P1 of the first angular interval A1 for which the driving tooth 280 is in the maximum extension configuration extends from 45° to 135°, and the portion P2 of the second angular interval A2 for which the driving tooth 280 is in the minimum extension configuration extends from 225° to 315°.

In any case, similar considerations apply when P1 and P2 have different extensions.

The revolving plug 115 in accordance with the illustrated embodiments has the great advantage of requiring a groove 290 in the cylinder housing 200 to allow the rotary movement of the revolving plug 115, whose extension along the y direction is very reduced. In fact, the peculiarity of having the driving tooth 280 radially translate with respect to the rotation axis R—or more generally having the operative distance between the engage portion 282 and the rotation axis R that is variable—during the rotation of the rotor element 275, allows to have that the driving tooth 280 protrudes significantly from the surface of rotor 275 only when necessary, i.e., when the tooth is facing upward so as to be able to comfortably engage the lock bolt 120 of the lock 100, while, when it is not necessary, it is withdrawn inside the rotor element 270. In this way, it is possible to achieve the same action on the lock bolt 120 which can be obtained by the known lock cylinders, while at the same time no longer having the need to request an extended groove 290 (along the direction y) to allow the passage of actuation tooth of the revolving plug when the revolving plug is in an angular position in which the driving tooth is turned downward (i.e., toward the lower part of the lock cylinder itself).

Thanks to the revolving plug 115 in accordance with the embodiments of the present invention, it is therefore possible to implement a large part of the central portion of the lower section 210 of the cylinder housing 200 below the revolving plug 115 as a single solid piece, for example in metallic material, which extends without interruption throughout the thickness along the z direction.

In the known solutions, the central portion of the lower section of the housing cylinder is provided with an empty groove that extends vertically (along the direction y) for a large part of the housing and through the whole thickness of it (along the direction z) in such a way to allow rotation of the actuator of the revolving plug. Consequently, the overall mechanical strength of the known lock cylinders is rather compromised. On the contrary, since in the solution according to the embodiments of the present invention the groove 290 has a very small vertical extension (along the y direction), it is possible to implement a lock cylinder 110 which is much more robust, having a portion of the lower section 210 of the cylinder housing 200 below the revolving plug 115 made as a single piece along a large part of the vertical direction (along the y direction) of the lower section 210, until it almost reaches the revolving plug 115 itself. In particular, according to an embodiment of the present invention, the extension d along the y direction between the bottom of the groove 290 and the rotation axis R can be set to a value lower than the value of the operative distance (between the engagement portion 282 and the rotation axis R) corresponding to the maximum extension configuration. For example, the extension d between the bottom of the groove 290 and the rotation axis R can be set to a value only slightly higher than the value of the operative distance (between the engage portion 282 and the rotation axis R) corresponding to the configuration of minimum extension. For example, with reference to a European-type lock cylinder, this extension d may have a value which extends from 8.5 mm (corresponding to a groove 290 almost tangent to the revolving plug 115) to 10 mm, or in any case may have a value significantly lower than 16.5 mm.

In addition to being much more robust than the lock cylinders of the known solutions, the lock cylinder 110 in accordance with the embodiments of the present invention is also much more safe against tampering and lock picking attempts which use break-in techniques of the "snapping" type, since the portion of the lower section 210 of the cylinder housing 200 below the revolving plug 115 is mainly made by means of a single piece of sturdy material, which is difficult to break and which is difficult to cross with burglary tools.

Figure 5:
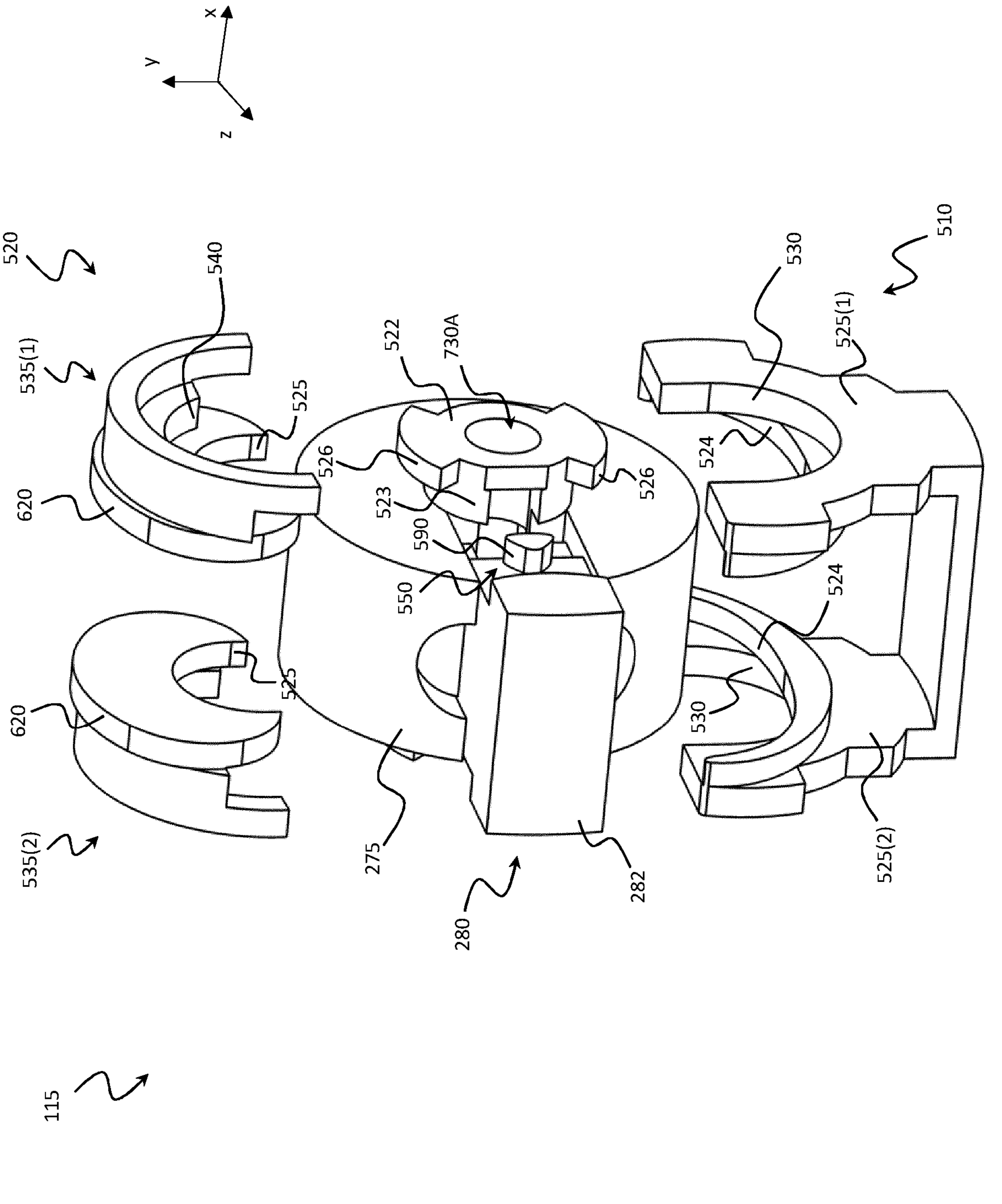
FIG. 5 is a partially exploded view of the revolving plug in accordance with an embodiment of the present invention with the driving tooth in the rest configuration.
Figure 6B:
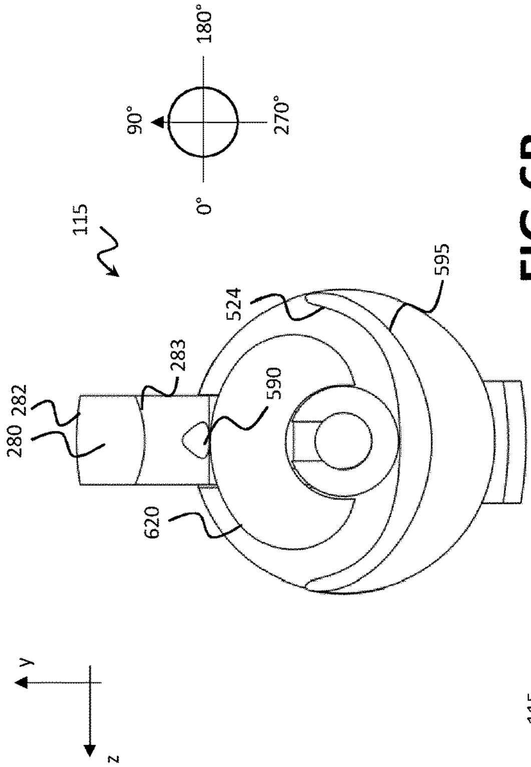
FIGS. 6A-6C are sectional views of the revolving plug in accordance with an embodiment of the present invention with the driving tooth in the rest, maximum extension and minimum extension configurations, respectively.
Figure 6C:
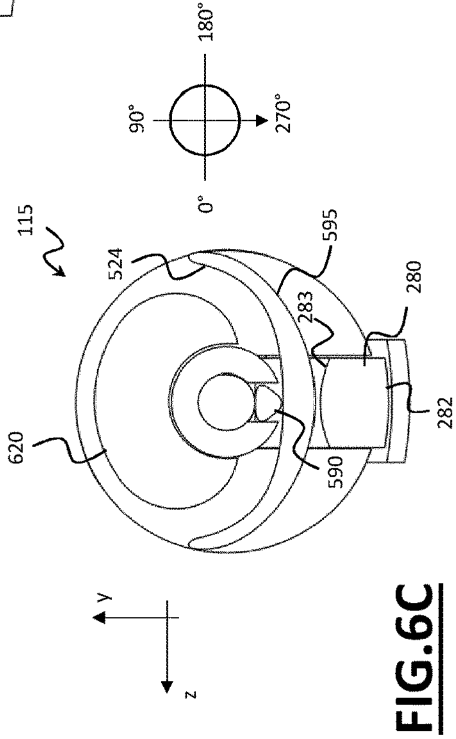
Figure 6A:
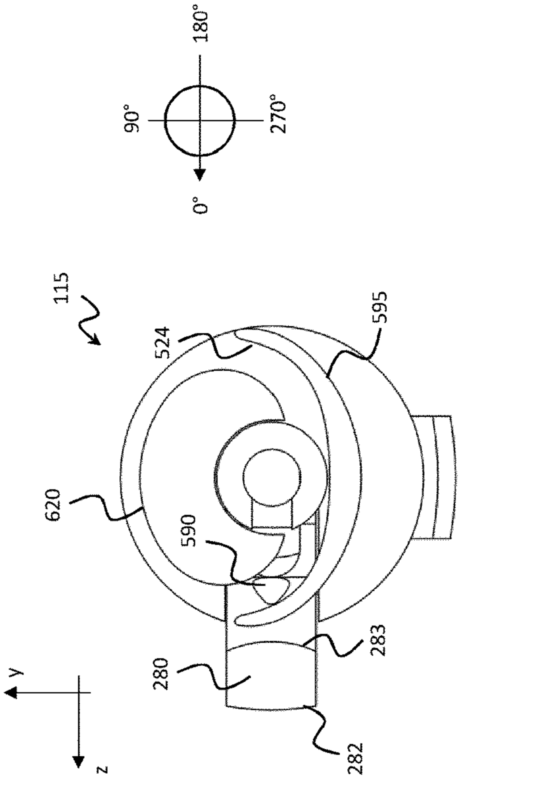

To describe the structure of the revolving plug in greater detail 115 according to an embodiment of the present invention, it will now be made reference to FIG. 2B in conjunction with the FIGS. 5 and 6A-6C, where FIG. 5 is a partially exploded view of the revolving plug 115 with the driving tooth 280 in the rest configuration, and FIGS. 6A-6C are section views of the revolving plug 115 with the driving tooth 280 in the rest, maximum extension and minimum extension configurations, respectively, carried out by sectioning the revolving plug 115 and according to a section plane parallel to the directions y and z.

In accordance with an embodiment of the present invention, the rotor element 275 of the revolving plug 115 is able to rotate around the rotation axis R within a rotation support comprising a lower section, identified as a rotation support lower section 510 and a upper section, identified as rotation support upper section 520.

In accordance with an embodiment of the present invention, the rotor element 275 is provided with two shoe elements 522 (one only of which is visible in the figures) that protrude from the rotor element 275 along the rotation axis R.

In the embodiment illustrated in the figures, each shoe element 522 includes a portion having a cylindrical shape and whose axis is coaxial with the rotation axis R. The side surface of the cylindrical portion of each shoe element 522, identified with the reference 523, is adapted to slidingly engage by rotation corresponding inner guide (arcuate) profiles 524 on the lower rotation support section 510 and corresponding inner guide (arcuate) profiles 525 on the upper section of the rotation support 520. In accordance with an embodiment of the present invention, each shoe element 522 also comprises a terminal portion having two engage elements that exhibit side engage (arcuate) surfaces 526 adapted to slidably engage by rotation corresponding external guide profiles (shaped as an arc of circumference) 530 on the rotation support lower section 510 and corresponding external guide profiles (shaped as an arc of circumference) 540 on the rotation support upper section 520. Naturally, similar considerations apply also in the case in which the end portion of the sliding elements 522 has a different shape, as for example in the case there is a number of engage elements different from two.

In accordance with an embodiment of the present invention, the rotation support lower section 510 comprises two lower support elements 525(1), 525(2) in the shape of "Y" facing parallel to the directions y and z; the two lower support elements 525 (1), 525 (2) have a mutual distance along the direction x corresponding to the width of the rotor element 275, so as to house the latter between them. Each of the lower support elements 525(1), 525(2) comprises in correspondence of the outer faces of them (i.e., the faces that are not directed toward the housed rotor element 275) one of the external guide profiles 530. In this way, the external guide profiles 530 are able to support the sliding elements 522 of the rotor element 275 from below by slidingly engaging the side engage surfaces 526.

In accordance with an embodiment of the present invention, the rotation support upper section 520 comprises two upper support elements 535(1), 535(2) adapted to be coupled from above to the two lower support elements 525(1), 525(2), respectively, so as to form with these latter a rotation support which encloses the rotor element 275. Advantageously, in accordance with an embodiment of the present invention, the two upper support elements 535(1), 535(2) are in turn enclosed by the upper covers 205A and 205B. Each of the upper support elements 535(1), 535(2) comprises, at the outer faces thereof (i.e., the faces that are not facing towards the housed rotor element 275), one of the external guide profiles 540. In this way, the external guide profiles 540 are able to be slidingly engaged by rotation from below by the side engage surfaces 526 from the shoe elements 522 of the rotor element 275.

In accordance with an embodiment of the present invention, each of the lower support elements 525(1), 525(2) comprises at the inner faces (i.e., facing toward the rotor element 275) one of the inner guide profiles 524. In this way, the inner guide profiles are adapted to support from below the shoe elements 522 of the rotor element 275 by slidingly engaging by rotation the side surface 523.

In accordance with an embodiment of the present invention, each of the upper support elements 535(1), 535(2) comprises at the inner faces (i.e., facing towards the rotor element 275) one of the inner guide profiles 525. In this way, the inner guide profiles 525 are adapted to be slidably engaged in rotation from below by the side surface 523 of the shoe elements 522 of the rotor element 275.

In this way, as shown in FIGS. 4A-4C, when the rotation support upper section 520 is mounted on the rotation support lower section 510 to enclose the rotor element 275, each of the shoe elements 522 is enclosed in a double guide profile formed of the external guide profiles 530 and 540, and of the inner guide profiles 524, 525, and thus constrained to rotate about the rotation axis R.

In accordance with an embodiment of the present invention, the driving tooth 280 is slidably housed within a seat 550 which is radially provided in the rotor element 275 and defines radial side openings on both side faces of the rotor element parallel to the directions y and z.

In accordance with an embodiment of the present invention, the actuation tooth is provided with two engage elements 590 (only one of which is visible in the figures), each projecting laterally from a respective side face of the rotor element 275 along the direction x through the radial openings defined by the seat 550. Similar considerations apply also in the case in which the driving tooth 280 is provided with a single engage element 590, adapted to protrude from a single side face of the rotor element 275. In this latter case, the seat 550 can also define a single radial side opening formed on only one of the side faces of the rotor element.

As shown in FIGS. 6A and 6C, the engage elements 590 are configured to slidably engage the inner guiding profiles 524 of the lower support elements 525(1), 525(2) when the rotation angle of the rotor element 275 is included in an angular interval that extends from slightly less than 180° to slightly more than 0° (i.e., which substantially corresponds to the second angular interval A2).

As shown in FIG. 6B, the engage elements 590 are configured to slidably engage upper (arcuate) guide profiles 620 located at the inner faces (i.e., facing the rotor element 275) of the upper support elements 535(1), 535(2) when the rotation angle of the rotor element 275 is comprised in an angular interval that approximately extends from slightly more than 30° to slightly less than 150° (i.e., which corresponds to an angular interval slightly more large of and containing the portion P1 of the first angular interval A1).

Unlike the external guide profiles 530 and 540, which defined for the side engage surfaces 526 of the shoe elements 522 an overall guide profile having a circular shape, the guide profiles 524 and 620 define for the engage elements 590 an overall guide profile having an eccentric, not circular, shape, able to impose on the driving tooth 280 a particular law of radial motion within the seat 550 which is function of the rotation angle of the rotor 275 itself.

Moreover, the overall guide profile defined by the guide profiles 524 and 620 is arranged to support from below—along the direction y—the engage elements 590 both when the rotation angle of the rotor element 275 belongs to the first interval A1 and when the rotation angle of the rotor element 275 belongs to the second interval A2.

In particular, according to one embodiment of the present invention, the inner guide profiles 524 corresponding to the lower support elements 525(1), 525(2) have an arcuate shape more flattened and closer to the rotation centre of the rotor element 275 with respect to the upper guide profiles 620 corresponding to the lower support elements 535(1), 535(2), which instead are more similar to a semicircular profile and are more distant from the rotation centre of the rotor element 275.

In this way, when the rotation angle of the rotor element 275 exceeds 180° to enter the second angular interval A2 and moves towards 270°, the inner guide profiles 524 push the engage elements 590 from below—along the direction y—, forcing the driving tooth 280 to slide inside the seat 550 towards the centre of the rotor element 275, for example until it retracts completely (or at least substantially) within the rotor element 275 when the driving tooth 280 is in the minimum extension configuration (case shown in FIG. 6C, in which the rotation angle of the rotor element is equal to 270°, corresponding to the central rotation angle of the second angular interval A2 and of the corresponding portion P2 of it).

When instead the rotation angle of the rotor element 275 exceeds 270°, the driving tooth 280 is pushed to slide within the seat 550 in the opposite direction, to move away from the centre of the rotor element 275. The initial thrust which allows the driving tooth 280 to move away from the centre of the rotor element 275 is exerted in this case by the interaction between a portion 283 of the driving tooth 280 opposite the engage portion 282, and inner guide profiles 595 of the rotation support lower section 510 opposite to the inner guide profiles 524.

Once 0° has been exceeded to enter the first angular interval A1, and by approaching 90°, the engage elements 590 disengage from the inner guide profiles 524 and engage the upper guide profiles 620. The upper guide profiles 620 push the engage elements 590 from below along—the direction y—, forcing the driving tooth 280 to slide within the seat 550 away from the centre of the rotor element 275, until reaching the maximum extension configuration (case shown in FIG. 6B, in which the rotation angle of the rotor element is equal to 90°, corresponding to the central rotation angle of the first angular interval A1 and of the corresponding portion P1 of it).

Reassuming, according to the embodiments of the invention, the engage elements 590 are guided along an "open" and "discontinuous" overall guide profile defined by the two distinct and separate—i.e., spaced apart from each other—guide profiles 524 and 620, wherein:

the inner guide profiles 524 are arranged to support from below the engage elements 590 when the rotation angle of the rotor element 275 belongs to the second interval A2;

the upper guide profiles 620 are arranged to support from below the engage elements 590 when the rotation angle of the rotor element 275 belongs to the first interval A1.

The inner guide profile 524 has the purpose of forcing the driving tooth 280 to slide inside the seat 550 towards the centre of the rotor element 275, while the upper guide profiles 620 has the purpose of forcing the driving tooth 280 to slide within the seat 550 away from the centre of the rotor element 275.

According to an embodiment of the present invention not illustrated in the figures, one or both of the guide profiles 524, 620 may be formed in turn by two or more discontinuous portions.

Figure 7A:
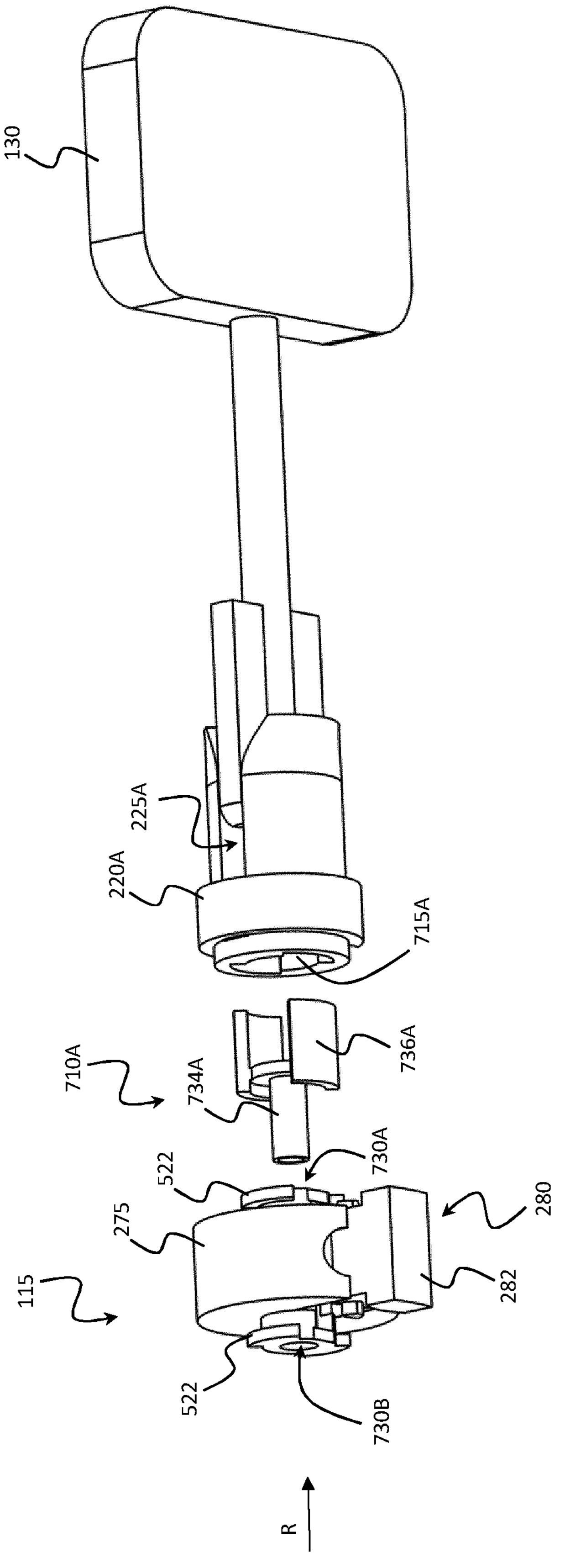
FIGS. 7A and 7B illustrate a selective coupling structure between driving pins and revolving plug in accordance with an embodiment of the present invention.
Figure 7B:
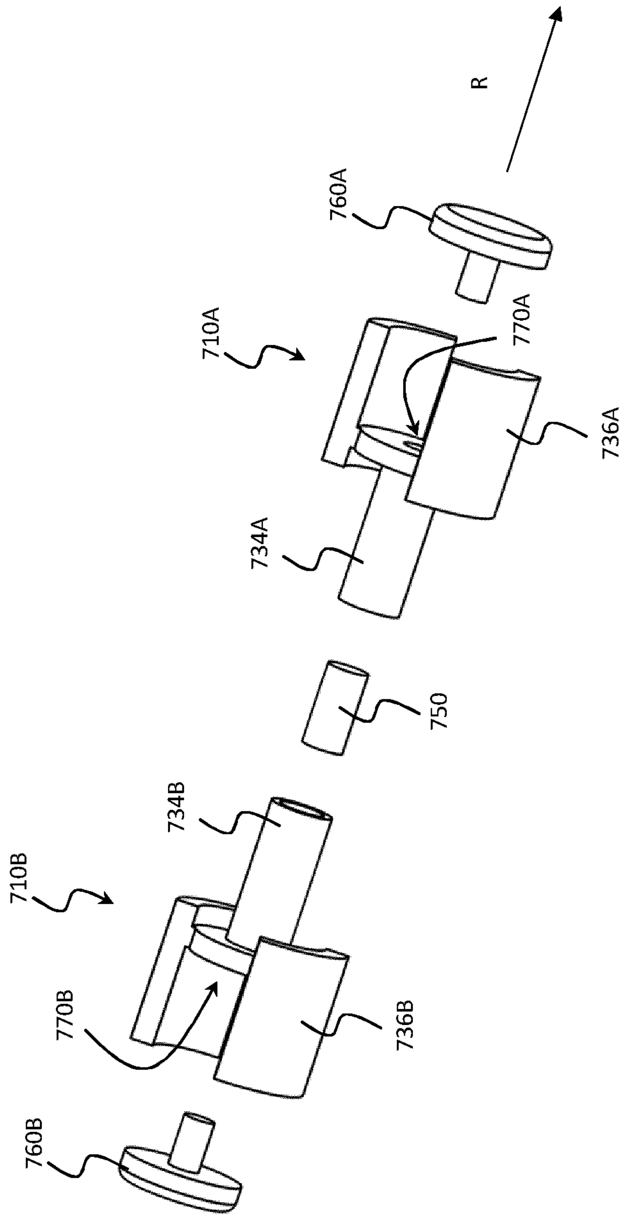

In accordance with an embodiment of the present invention, each driving pin 220A, 220B can be selectively coupled in an exclusively manner with the revolving plug 115, so as to be able to transfer the rotary movement of this driving pin 220A, 220B also to the revolving plug 115, by means of a selective coupling structure illustrated in FIGS. 7A and 7B.

The FIG. 7A is an exploded view with partially removed parts of the lock cylinder 110 in which there are visible a portion of the selective coupling structure, the rotor element 275, and the actuating pin 220A, with the key 130 which is partially inserted in the key seat 225A, while FIG. 7B shows an exploded view of the complete selective coupling structure according to an embodiment of the present invention.

In order to describe the selective coupling structure in accordance with an embodiment of the present invention, reference will first be made to FIG. 7A, in which it will be described the portion of this selective coupling structure dedicated to the selective coupling by rotation between the drive pin 220A and the rotor member 275.

In accordance with an embodiment of the present invention, the selective coupling structure comprises a plug element 710A configured so as to engage on one side within a insertion hole 715A formed in the end of the driving pin 220A opposite the end in which the key seat 225A is provided, and on the opposite side within a hole 730A formed in the end portion of the shoe element 522 of the rotor element 275 (see also FIG. 5) which faces toward the driving pin 220A.

Both the holes 715A and 730A are aligned along the rotation axis R and allow the plug element 710A to slide into them, and therefore to move with respect to the rotor element 275 and the driving pin 220A along the rotation axis R. In this regard, in accordance with an embodiment of the present invention, the plug element 710A comprises a cylindrical portion 734A adapted to slide within the hole 730A of the shoe element 522 along the rotation axis R and an engage portion 736A shaped so as to allow sliding within the insertion hole 715A of the driving pin 220A along the rotation axis R.

Moreover, the engagement portion 736A and the coupling hole 715A are shaped so as to ensure that the plug element 710A is at the same time always constrained by rotation with the driving pin 220A. In this way, when the key 130 is inserted in the key seat 225A of the driving pin 220A, the plug element 710A can be rotated by the driving pin 220A when the latter is in turn driven by the rotary movement of the key 130.

In accordance with an embodiment of the present invention, the engagement portion 736A of the plug element 710A is further shaped to engage the parts of the end portion of the shoe element 522 placed between the two engage elements which exhibit the side engage surfaces 526—and therefore allowing the rotor element 275 (and the entire revolving plug 115) to be dragged in rotation around the rotation axis R by the rotation of the driving pin 220A—when the plug element 710A is pushed (along the rotation axis R) against the rotor element 275 following the insertion of the key 130 within the key seat 225A.

In other words, in accordance with an embodiment of the present invention, the plug element 710A allows to selectively transmit the rotation of the driving pin 220A to the rotor element 275 (and hence to the revolving plug 115) in function of the position of the plug element 710A along the rotation axis R:

when the plug element 710A is sufficiently spaced from the rotor element 275 to cause the engagement portion 736A to be separated from the shoe element 522, the rotation of the driving pin 220A is not transmitted to the rotor element 275;

when the plug element 710A is pushed towards the rotor element 275 and the engagement portion 736A engages the sliding element 522, the rotation of the driving pin 220A is transmitted to the rotor element 275.

Referring now to FIG. 7B, in which the complete selective coupling structure is illustrated by an exploded view, a plug element 710B is visible, configured for the selective coupling by rotation between the driving pin 220B and the rotor element 275. The plug element 710B has the same structure of the plug element 710A and performs the same function of the plug element 710A, but relative to the driving pin 220B. In particular, the plug element 710B comprises a cylindrical portion 734B (corresponding to the cylindrical portion 734A) and an engage portion 736B (corresponding to the engagement portion 736A).

In accordance with an embodiment of the present invention, the plug element 710A and the plug element 710B are made of magnetic material, and are connected to each other, by means of a magnet 750, with the ends of the cylindrical portions 734A and 734B which are in contact and aligned along the rotation axis R, so as to enclose (along the rotation axis R) on both sides the rotor element 275 of the revolving plug 115 passing through the holes 730A and 730B made in the terminal portion of the two sliding elements 522 of the rotor element 275. Thanks to the connection between the plug element 710A and the plug element 710B, the relative distance d' between the two engage portions 736A and 736B is fixed. In accordance with an embodiment of the present invention, this distance d' is set so as to implement the mutually selective coupling by rotation between the rotor element 275 of the revolving plug 115 and one selected between the driving pin 220A and the driving pin 220B. In particular, according to an embodiment of the present invention, the distance d' is such that when one of the engage portions 736A or 736B engages the respective shoe element 522 of the rotor element 275, and therefore the respective driving pin 220A or 220B is constrained by rotation with the rotor element 275, the other engage portion 736B or 736A is disengaged from the shoe element, and therefore the respective driving pin 220B or 220A is free to loosely rotate without causing the rotor element 275 of the revolving plug 115 to rotate.

In accordance with an embodiment of the present invention, the mutual selectivity of the coupling by rotation between the rotor element 275 of the revolving plug 115 and one selected between the driving pin 220A and the driving pin 220B is allowed provided that the key 130 is inserted completely within one of the two key seats 225A, 225B, otherwise both the driving pins 220A and 220B could be simultaneously coupled with the rotor element 275.

In accordance with other embodiments of the present invention, instead of being connected together by means of the magnet 750, the plug element 710A and the plug element 710B can be connected to each other by gluing, welding, screwing, or other equivalent fixing elements (in these cases, the plug elements 710A and 710B can of course be made of a material that is not necessarily magnetic).

According to an embodiment of the present invention, the driving tooth 280 is provided with an eyelet 790 (visible in FIG. 2B), i.e., a radially elongated hole or slot, adapted to be crossed by the cylindrical portions 734A and 734B of the plug elements 710A, 710B.

In this way, thanks to the presence of the eyelet 790, the driving tooth 280 is able to rotate together with the rotor element 275 and slide within the seat 550, but at the same time the driving tooth 280 cannot extend beyond the maximum extension configuration.

According to an embodiment of the invention, this is obtained by properly setting the length (along the radial direction with respect to the rotation centre of the rotor element 275) of the eyelet 790 in such a way that when the driving tooth is in the maximum extension configuration, the cylindrical portions 734A and 734B of the plug elements 710A, 710B enter into contact with the end of the eyelet 790 closest to the rotation centre of the rotor element 275.

Thanks to the combined effect given by:

- the mechanical constraint given by the interaction between the engage elements 590 and the guide profile defined by the guide profiles 524 and 620, and
- the mechanical constraint given by the interaction between the eyelet 790 and the cylindrical portions 734A and 734B of the plug elements 710A, 710B, the driving tooth 280 is advantageously allowed to rotate together with the rotor element 275 and radially slide within the seat 550 without the need of any elastic biasing mean (such as a spring) exerting a restoring force on the driving tooth 280.

In accordance with an embodiment of the present invention, the selective coupling structure further comprises for each plug element 710A and 710B a corresponding nail element 760A, 760B comprising a flat head adapted to be housed in the corresponding actuating pin 220A, 220B, and a rod capable of being housed in a hole 770A, 770B of the corresponding plug element 710A, 710B that extends along the rotation axis R. These nail elements 760A, 760B represent the point of support by means of which a key 130 inserted in a key seat 225A, 225B of one of the two actuating pins 220A, 220B allows this driving pin 220A, 220B to be pushed against the rotor element 275.

In accordance with an embodiment of the present invention, the nail elements 760A, 760B are free to loosely rotate around the rotation axis both with respect to the driving pins 220A, 220B, and with respect to the plug elements 710A, 710B. In this way, the nail elements 760A, 760B allow to protect the lock cylinder 110 from potential attacks made by drilling along the rotation axis R, since these nail elements 760A, 760B would rotate together with the drill bit, preventing the drilling thereof. Advantageously, in accordance with an embodiment of the present invention, the driving pins 220A and 220B are shaped so as to prevent the nail elements 760A, 760B from being able to escape through the key seats 225A, 225B.

With the aim of describing in greater detail the rotation block mechanism 235 according to an embodiment of the present invention, reference will now be made to FIGS. 8A-8C, which illustrate the lock cylinder 110 lacking of the cylinder housing 200 and of the control system of the lock cylinder so as to show how the rotation block mechanism 235 interacts with the two driving pins 220A, 220B.

In accordance with an embodiment of the present invention, the rotation block mechanism 235 is a linear slide located below the revolving plug 115 and comprising two stop elements 800A, 800B (for example two fork elements) which extend upwards along the direction y to engage corresponding stop seats 810A, 810B made on portions of the driving pins 220A, 220B close to the revolving plug 115.

In accordance with an embodiment of the present invention, the rotation block mechanism 235 is adapted to be moved along a direction parallel to the x axis by the electromechanical actuator 260 on the basis of the lock unlocking combinations provided on the key 130 inserted in one of the key seats 225A, 225B.

When no key 130 is inserted in any of the two key seats 225A, 225B, or when the inserted key 130 does not provide the correct combination, the position of the rotation block mechanism 235 is centred with respect to the revolving plug 115, and both stop elements 800A, 800B are engaged within the respective stop seats 810A, 810B made in both the driving pins 220A, 220B. In this condition, none of the two driving pins 220A, 220B can be rotated, because the rotation is blocked by the stop elements 800A, 800B engaged in the stop seats 810A, 810B. This condition is illustrated in FIG. 8A.

When the logic unit 250 recognizes that a key 130 which provides the correct combination has been inserted in the key housing 225B, it generates an unlocking signal which is sent to the electromechanical actuator 260 to cause the rotation block mechanism 235 laterally translate (along a direction parallel to the direction x) away from the driving pin 220B, until the stop element 800B protrudes from the respective stop seat 810B. In this situation, while the driving pin 220A is still locked by the stop element 800A which is still engaged in the stop seat 810A, the driving pin 220B is free to rotate. By rotating the key 130 inserted in the key seat 225B, the driving pin 220B rotates transferring this rotation to the revolving plug 115, so as to actuate the lock bolt 120 by means of the consequent rotation of the driving tooth 280. This condition is illustrated in FIG. 8B.

When the logic unit 250 recognizes that a key 130 which provides the correct combination has been inserted in the key seat 225A, it generates an unlocking signal which is sent to the electromechanical actuator 260 to cause the rotation block mechanism 235 laterally translate (along a direction parallel to the direction x) away from the driving pin 220A, until the stop element 800A protrudes from the respective stop seat 810A. In this situation, while the driving pin 220B is still locked by the stop element 800B which is still engaged in the stop seat 810B, the driving pin 220A is free to rotate. By rotating the key 130 inserted in the key seat 225A, the driving pin 220A rotates transferring this rotation to the revolving plug 115, so as to actuate the lock bolt 120 by means of the consequent rotation of the driving tooth 280. This condition is illustrated in FIG. 8C.

Figure 8A:
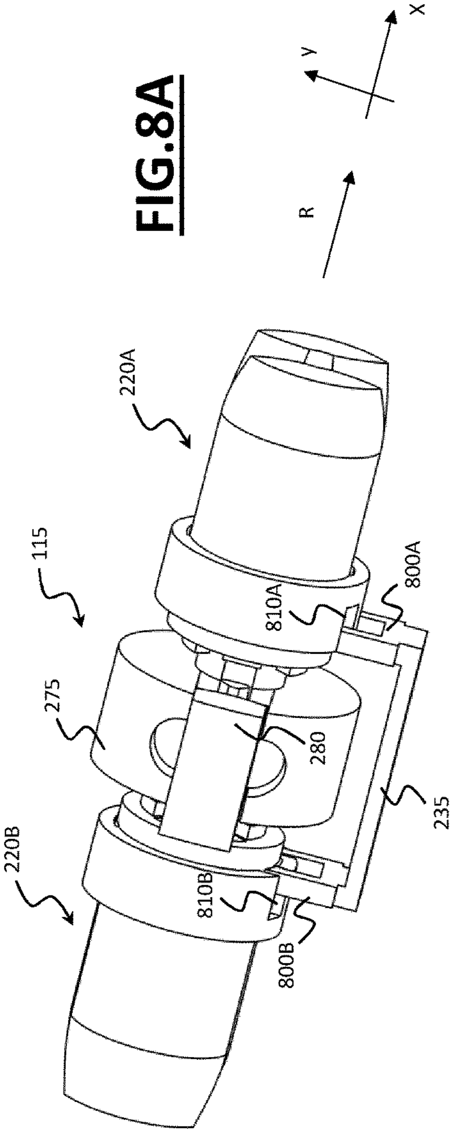
FIGS. 8A-8C illustrate the lock cylinder deprived of the cylinder housing and of the control system of the cylinder lock and a rotating block mechanism in accordance with an embodiment of the present invention.
Figure 8C:
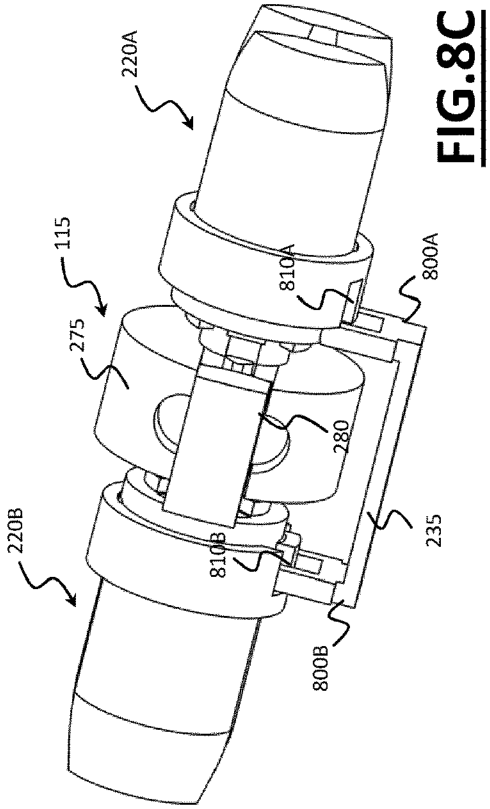
Figure 8B:
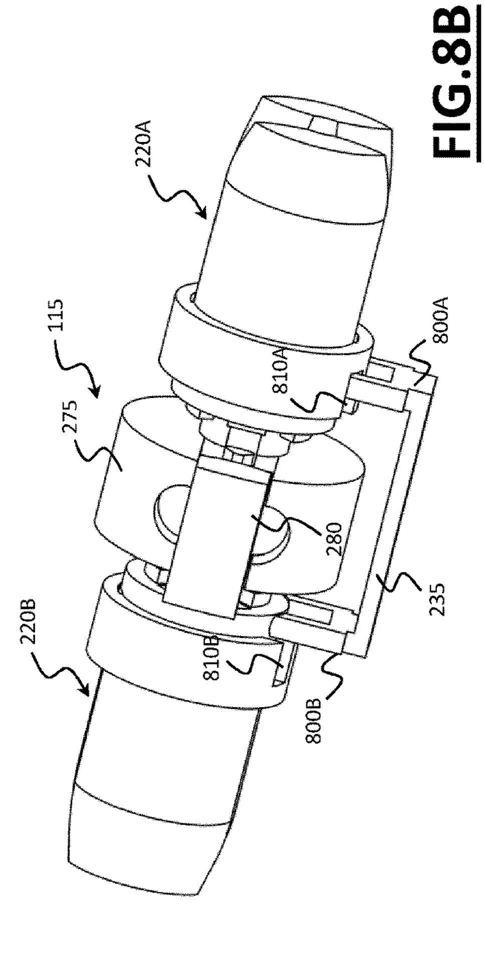

In accordance with an embodiment of the present invention, the lengths of the stop seats 810A, 810B and the distance between the stop elements 800A, 800B along the x direction are set so as to allow the rotation block mechanism 235 to assume the three conditions illustrated in FIGS. 8A-8C. In particular, the length of the seat stop 810A along the direction x is sufficiently extended to allow a side movement of the rotation block mechanism 235 such as to completely disengage the stop member 800B from the stop seat 810B, and the length of the stop seat 810B along the direction x is sufficiently extended to allow a side movement of the rotation block mechanism 235 such as to completely disengage the stop element 800A from the stop seat 810A. For example, when the stop element 800B is completely disengaged from the stop seat 810B, the stop element 800A is at the end of its stroke in the stop seat 810A, whereas when the stop element 800A is completely disengaged from the stop seat 810A, the stop element 800B is at the end of its stroke in the stop seat 810B.

The concepts of the present invention can also be applied to the case in which the rotation block mechanism 235 is structured in a different manner, for example by allowing a condition to be assumed in which both the driving pins 220A, 220B are free to rotate.

Thanks to the fact that the revolving plug 115 in accordance with embodiments of the present invention includes a groove 290 having a greatly reduced vertical extension (along the direction y), it is possible to provide a single rotation lock mechanism 235, and driveable by a single electromechanical actuator 260, positioned below the revolving plug 115 and adapted to lock/unlock both the driving pins 220A, 220B (as just described above). This configuration is much safer, cheaper and more robust than the known solutions, in which, due to the presence of this window, two different and more complicated rotation locking devices are required for the two driving pins, arranged on the sides of the window, or coaxially to the pins themselves, or even it is possible to implement the electromechanical implementation for only one side of the cylinder.

In accordance with an embodiment of the present invention, the circular crowns of the driving pins 220A, 220B in which the stop seats 810A, 810B lie are able to rotate in dedicated seats of the lower section 210 of the cylinder housing 200 so as to prevent that the driving pins 220A, 220B may be unthreaded, by means of break-in, along the rotation axis R.

In order to describe in greater detail how the electric, electronic, optical, and/or electromechanical components of the control system of the lock cylinder inside the cylinder housing 200 are arranged, reference will be made to FIG. 2C together with FIG. 9.

As already mentioned previously, in accordance with an embodiment of the present invention, the electric, electronic, optical, and/or electromechanical components of the control system of the lock cylinder are arranged on two printed circuit boards 910, 920 housed inside the cylinder housing 200 and arranged facing each other parallel to the x and y directions. Of course, the concepts of the present invention can also be applied to the case where a different number of printed circuit boards is housed within the housing cylinder 200, such as three cards or a single card.

Figure 9:
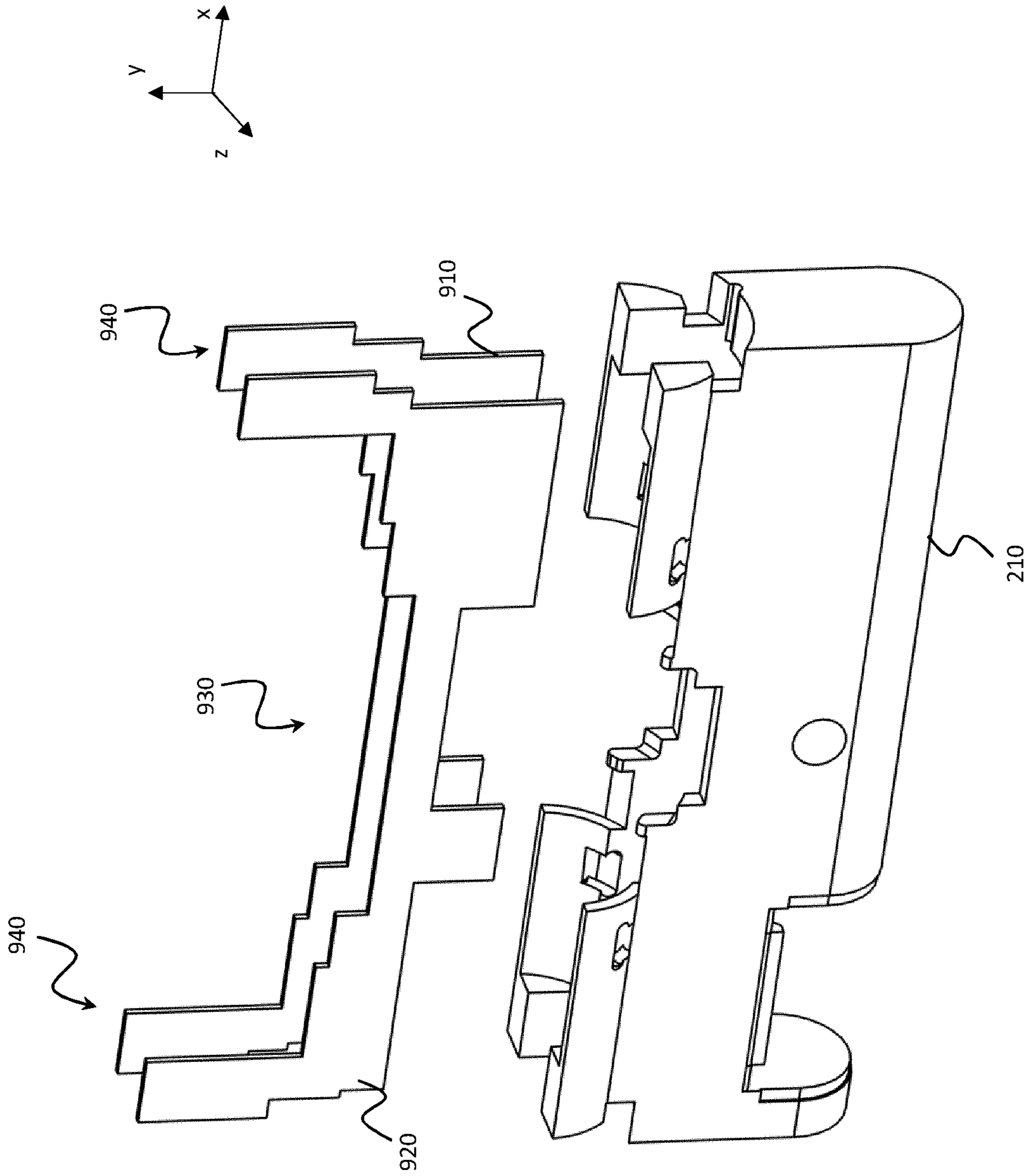
FIG. 9 shows the lower section of the housing cylinder and two printed circuit boards pulled out from the cylinder housing in accordance with an embodiment of the present invention.

While in the section view FIG. 2C only one printed circuit board 910 is visible, FIG. 9 shows both the printed circuit boards 910, 920 removed from the cylinder housing (for convenience of depiction, in FIG. 9 only the lower section 210 of the cylinder housing 200 is visible).

Each printed circuit board 910, 920 is substantially U-shaped, with a central section 930 which extends substantially along the x direction and is intended to be housed at the lower section 210, and two side sections 940 which extend substantially along the direction y and whose extension is such that the upper ends of these sections 940 are intended to face the key seats 225A, 225B of the driving pins 220A, 220B when the printed circuit boards 910, 920 are installed in the cylinder housing 200.

In accordance with an embodiment of the present invention, since most of the central portion of the lower section of the cylinder housing 200 below the revolving plug 115 is made as a single solid piece, the central portions of the central section 930 of the printed circuit boards 910, 920 have a very small extension along the y direction.

Accordingly, in accordance with an embodiment of the present invention, the logic unit 250, the electromechanical actuator 260, and the power supply unit are preferably installed in side portions of the central section 930 of one or both printed circuit boards 910, 920.

In accordance with an embodiment of the present invention, the reading sensors 245A, 245B are instead advantageously located on the upper ends of the side sections 940 of both the printed circuit boards 910, 920, in front of the key seats 225A, 225B of the driving pins 220A, 220B. For example, the emitters of the reading sensors 245A, 245B are arranged on one of the two printed circuit boards 910, 920 while the receivers of the reading sensors 245A, 245B are arranged on the other one of the two boards, so as to allow the receivers to receive the detection radiations emitted by the emitters and filtered by the key 130 when the latter is inserted in one of the key seats 225A, 225B. Alternatively, the emitters of the reading sensors 245A and the receivers of the reading sensors 245A can be arranged on one of the two printed circuit boards 910, 920, while the emitters of the reading sensors 245B and the receivers of the reading sensors 245B can be arranged on the other one of the two printed circuit boards 910, 920.

In accordance with an embodiment of the present invention illustrated in FIG. 2C, an electrical connector 980 is provided to allow the electrical connection between the two printed circuit boards 910, 920.

The invention claimed is:

1. A lock cylinder adapted to be installed in a lock comprising a lock bolt for driving the lock bolt, said lock cylinder comprising:

a cylinder housing;

a revolving plug comprising a rotor element adapted to rotate with respect to the cylinder housing about a rotation axis within a rotation support, and a driving tooth for the lock bolt comprising an engage portion adapted to engage the lock bolt, said driving tooth being rotatable about the rotation axis together with the rotor element and being coupled to the rotor element in such a way the operative distance between the engage portion of the driving tooth and the rotation axis varies, while rotating about the rotation axis, as a function of the rotation angle of the rotor element with respect to the cylinder housing, wherein, when the lock cylinder is installed in the lock:

said operative distance has one among a plurality of first values when the rotation angle of the rotor element belongs to a first angular interval corresponding to a position of the engage portion of the driving tooth that is proximal to the lock bolt; and said operative distance has one among a plurality of second values when the rotation angle belongs to a second angular interval corresponding to a position of the engage portion of the driving tooth that is distal to the lock bolt, each of said first values being higher than each of said second values, wherein:

when the lock cylinder is installed in the lock, the lock cylinder is located below the lock bolt along a first direction substantially perpendicular to the rotation axis;

the driving tooth is slidingly housed within a seat which is radially provided in the rotor element and which defines at least one side opening of the rotor element perpendicular to the rotation axis;

the driving tooth is provided with at least one engage element which protrudes from a side opening along a direction parallel to the rotation axis, and adapted to slidingly engage guide profiles provided on the rotation support, said guide profiles defining for said at least one engage element an overall guide profile having an eccentric shape arranged to support from below along said first direction said at least one engage element when the rotation angle of the rotor element belongs to both the first angular interval and to the second angular interval, said overall guide profile being adapted to cause said variation of the operative distance as a function of the rotation angle of the rotor element with respect to the cylinder housing; and wherein said overall guide profile defined by said guide profiles is a discontinuous guide profile.

2. The lock cylinder of claim 1, wherein said guide profiles defining said overall guide profile comprise first guide profiles and second guide profiles, said first guide profiles and said second guide profiles being separated and spaced apart from each other.

3. The lock cylinder of claim 2, wherein:

said first guide profiles are arranged to support from below along said first direction said at least one engage element when the rotation angle of the rotor element belongs to the first angular interval;

said second guide profiles are arranged to support from below along said first direction said at least one engage element when the rotation angle of the rotor element belongs to the second angular interval.

4. The lock cylinder of claim 1, wherein the revolving plug is configured in such a way that, when the lock cylinder is installed in the lock:

the driving tooth is in a maximum extension configuration wherein said operative distance is equal to the highest one among said first values when the rotation angle is included in at least one corresponding portion of the first angular interval corresponding to a position of the engage portion of the driving tooth that is substantially faced toward the lock bolt;

the driving tooth is in a minimum extension configuration wherein said operative distance is equal to the lowest one among said second values when the rotation angle is included in at least one corresponding portion of the second angular interval corresponding to a position of the engage portion of the driving tooth that is substantially faced along a direction that is opposite to the lock bolt.

5. The lock cylinder of claim 4, wherein:

the cylinder housing comprises a groove which extends from the rotation axis along the first direction for a value lower than the highest among said first values of said operative distance.

6. The lock cylinder of claim 5, wherein the lock cylinder is a European type cylinder and said vale for which said groove extends from the rotation axis along the first direction is lower than 16.5 mm, preferably lower than 10 mm, still more preferably equal to 8.5 mm.

7. The lock cylinder of claim 1, further comprising:

at least one driving pin provided with a respective key seat configured for receiving a key, and housed in the cylinder housing in such a way to be rotatable inside the cylinder housing about the rotation axis;

a selective coupling structure configured for the rotational selective coupling between said at least one driving pin and the rotor element.

8. The lock cylinder of claim 7, wherein said selective coupling structure comprises, for the at least one driving pin a respective plug element configured in such a way to be inserted from a first side into an insertion hole located in the corresponding driving pin, and from a second side opposite to said first side into a hole located in the rotor element, said plug element being free of move within said holes along the rotation axis under the push action of the key during the insertion of the key within the respective key seat.

9. The lock cylinder of claim 8, wherein:

the revolving plug is configured in such a way that, when the lock cylinder is installed in the lock:

the driving tooth is in a maximum extension configuration wherein said operative distance is equal to the highest one among said first values when the rotation angle is included in at least one corresponding portion of the first angular interval corresponding to a position of the engage portion of the driving tooth that is substantially faced toward the lock bolt;

the driving tooth is in a minimum extension configuration wherein said operative distance is equal to the lowest one among said second values when the rotation angle is included in at least one corresponding portion of the second angular interval corresponding to a position of the engage portion of the driving tooth that is substantially faced along a direction that is opposite to the lock bolt, and wherein:

said driving tooth comprises an eyelet, said plug element being configured in such a way to be inserted from said second side into said eyelet.

10. The lock cylinder of claim 9, further comprising a rotation block mechanism adapted to selectively prevent the rotation of the at least one driving pin as a function of the correctness or not of a lock unlocking combination present on the key.

11. The lock cylinder of claim 10, wherein:

said at least one driving pin comprises two driving pins aligned along the rotation axis, the revolving plug being located between the two driving pins;

said rotation block mechanism comprises a linear slide comprising two stop elements adapted to engage corresponding stop seats located on the driving pins:

the lock cylinder further comprises an electromechanical actuator adapted to move the linear slide along a direction parallel to the rotation axis as a function of the correctness or not of the lock unlocking combination present on the key.

12. The lock cylinder of claim 8, further comprising a rotation block mechanism adapted to selectively prevent the rotation of the at least one driving pin as a function of the correctness or not of a lock unlocking combination present on the key.

13. The lock cylinder of claim 12, wherein:

said at least one driving pin comprises two driving pins aligned along the rotation axis, the revolving plug being located between the two driving pins;

said rotation block mechanism comprises a linear slide comprising two stop elements adapted to engage corresponding stop seats located on the driving pins:

the lock cylinder further comprises an electromechanical actuator adapted to move the linear slide along a direction parallel to the rotation axis as a function of the correctness or not of the lock unlocking combination present on the key.

14. The lock cylinder of claim 7, further comprising a rotation block mechanism adapted to selectively prevent the rotation of the at least one driving pin as a function of the correctness or not of a lock unlocking combination present on the key.

15. The lock cylinder of claim 14, wherein:

said at least one driving pin comprises two driving pins aligned along the rotation axis, the revolving plug being located between the two driving pins;

said rotation block mechanism comprises a linear slide comprising two stop elements adapted to engage corresponding stop seats located on the driving pins:

the lock cylinder further comprises an electromechanical actuator adapted to move the linear slide along a direction parallel to the rotation axis as a function of the correctness or not of the lock unlocking combination present on the key.

16. The lock cylinder of claim 1, wherein said guide profiles defining said overall guide profile comprise first guide profiles and second guide profiles, said first guide profiles and said second guide profiles being separated and spaced apart from each other.

17. The lock cylinder of claim 16, wherein:

said first guide profiles are arranged to support from below along said first direction said at least one engage element when the rotation angle of the rotor element belongs to the first angular interval;

said second guide profiles are arranged to support from below along said first direction said at least one engage element when the rotation angle of the rotor element belongs to the second angular interval.

* * * * *